(12) United States Patent
Agon et al.

(10) Patent No.: US 12,399,496 B2
(45) Date of Patent: Aug. 26, 2025

(54) DETECTING POSITIONING OF A SENSOR SYSTEM ASSOCIATED WITH A VEHICLE

(71) Applicant: Lyft, Inc., San Francisco, CA (US)

(72) Inventors: Alan Agon, Sunnyvale, CA (US); Michael Jared Benisch, Menlo Park, CA (US); Mason Lee, Sunnyvale, CA (US); Sameer Qureshi, Sunnyvale, CA (US); Luc Vincent, Palo Alto, CA (US)

(73) Assignee: Lyft, Inc., San Francisco, CA (US)

( * ) Notice: Subject to any disclaimer, the term of this patent is extended or adjusted under 35 U.S.C. 154(b) by 838 days.

(21) Appl. No.: 16/916,008

(22) Filed: Jun. 29, 2020

(65) Prior Publication Data

US 2021/0405641 A1   Dec. 30, 2021

(51) Int. Cl.
*B60W 40/072* (2012.01)
*B60W 60/00* (2020.01)
(Continued)

(52) U.S. Cl.
CPC ......... *G05D 1/0212* (2013.01); *B60W 40/072* (2013.01); *B60W 60/001* (2020.02); *G06V 20/588* (2022.01); *B60W 2520/06* (2013.01); *B60W 2552/53* (2020.02); *B60W 2554/801* (2020.02); *B60W 2554/802* (2020.02); *G05D 2111/10* (2024.01)

(58) Field of Classification Search
CPC ............. G05D 1/0212; G05D 2111/10; B60W 60/001; B60W 40/072; B60W 2552/53; B60W 2554/802; B60W 2554/801; B60W 2520/06; G06V 20/588
USPC .......................................................... 701/23
See application file for complete search history.

(56) References Cited

U.S. PATENT DOCUMENTS 9,386,302 B2 * 7/2016 Zeng .................... G06T 7/80
2007/0069874 A1 * 3/2007 Huang ............... B62D 15/029
340/435

(Continued)

FOREIGN PATENT DOCUMENTS

JP   2018034719      *  3/2018
JP   2018034719 A    *  3/2018

OTHER PUBLICATIONS

Davide Scaramuzza, Absolute Scale in Structure from Motion from a Single Vehicle Mounted Camera by Exploiting Nonholonomic Constraints, 2009, IEEE 12th International Conference on Computer Vision (ICCV) (Year: 2009).*

(Continued)

*Primary Examiner* — Matthias S Weisfeld
(74) *Attorney, Agent, or Firm* — Lee Sullivan Shea & Smith LLP

(57) ABSTRACT

Examples disclosed herein may involve a computing system that is operable to (i) identify, within a given period of operation of a vehicle having an associated sensor system for capturing sensor data, one or more times when the vehicle was driving in a lane having substantially-straight lane geometry, (ii) for each identified time, determine a respective measure of a lateral offset between the vehicle's associated sensor system and a lateral reference point of the vehicle, and (iii) based on the respective measure of the lateral offset that is determined for each of the one or more identified times, determine the lateral offset between the vehicle's associated sensor system and the lateral reference point of the vehicle.

18 Claims, 16 Drawing Sheets

(51) Int. Cl.
*G05D 1/00*     (2024.01)
*G05D 111/10*   (2024.01)
*G06V 20/56*    (2022.01)

(56) References Cited

U.S. PATENT DOCUMENTS

| | | | |
|---|---|---|---|
| 2011/0238252 A1* | 9/2011 | Takeda | G06V 20/588 |
| | | | 348/148 |
| 2016/0284087 A1* | 9/2016 | Natroshvili | G06T 7/80 |
| 2016/0318513 A1* | 11/2016 | Lee | B60W 10/20 |
| 2018/0232909 A1* | 8/2018 | Gagnon | G06T 7/80 |
| 2020/0108837 A1* | 4/2020 | Kim | B60W 30/045 |
| 2020/0198645 A1* | 6/2020 | Boer | B60K 28/06 |
| 2020/0290618 A1* | 9/2020 | Conrad | B60W 30/162 |
| 2021/0342600 A1* | 11/2021 | Westmacott | G06F 18/2148 |

OTHER PUBLICATIONS

C. Y. Kuo, On the Image Sensor Processing for Lane Detection and Control in Vehicle Lane Keeping Systems, Apr. 8, 2019, MDPI, Sensors (Year: 2019).*

* cited by examiner

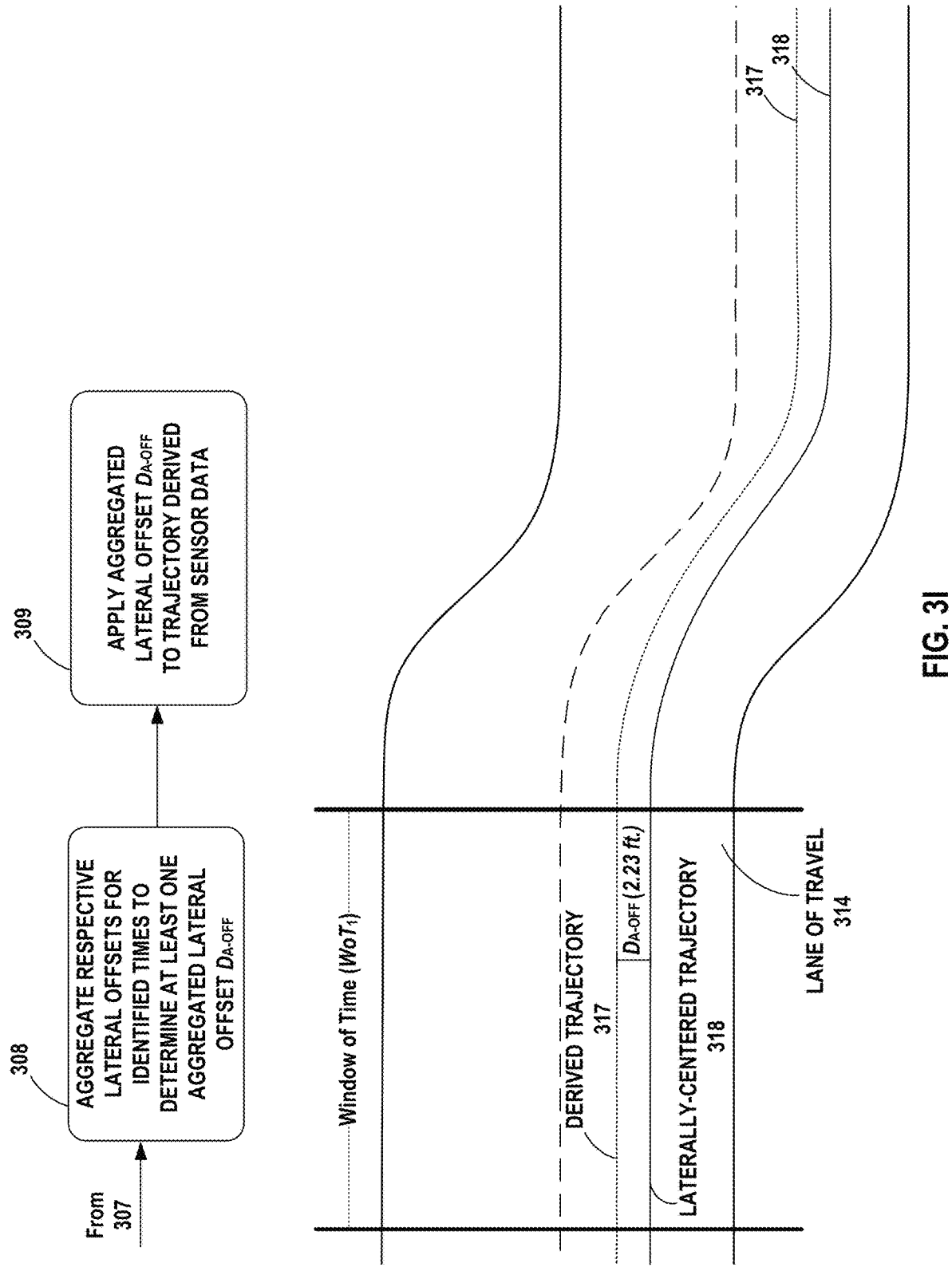

DETECTING POSITIONING OF A SENSOR SYSTEM ASSOCIATED WITH A VEHICLE

BACKGROUND

Vehicles are increasingly being equipped with sensors that capture sensor data while such vehicles are operating in the real world, and this captured sensor data may then be used for many different purposes, examples of which may include creating maps that are representative of the real world and/or building an understanding of how vehicles and/or other types of agents (e.g., pedestrians, bicyclists, etc.) tend to behave within the real world. The sensor data that is captured by these sensor-equipped vehicles may take any of various forms, examples of which include Global Positioning System (GPS) data, Inertial Measurement Unit (IMU) data, camera image data, Light Detection and Ranging (LiDAR) data, Radio Detection And Ranging (RADAR) data, and/or Sound Navigation and Ranging (SONAR) data, among various other possibilities.

SUMMARY

In one aspect, the disclosed technology may take the form of a method that involves: (i) identifying, within a given period of operation of a vehicle having an associated sensor system for capturing sensor data, one or more times when the vehicle was driving in a lane having substantially-straight lane geometry, (ii) for each identified time, determining a respective measure of a lateral offset between the vehicle's associated sensor system and a lateral reference point of the vehicle, and (iii) based on the respective measure of the lateral offset that is determined for each of the one or more identified times, determining the lateral offset between the vehicle's associated sensor system and the lateral reference point of the vehicle.

In example embodiments, identifying the one or more times when the vehicle was driving in a lane having substantially-straight lane geometry may take various forms. For instance, as one possibility, this function may involve localizing the vehicle's associated sensor system within a map encoded with lane geometry information, wherein the localizing produces a set of location points for the vehicle's associated sensor system within the map that each correspond to a respective time during the given period of operation, and then for each of one or more location points in the set of location points: (a) obtaining lane geometry information for a road segment surrounding the location point, (b) based on the obtained lane geometry information, determining that the road segment surrounding the location point has less than a threshold extent of curvature, and (c) in response to the determining, identifying the respective time corresponding to the location point as one time when the vehicle was driving in a lane having substantially-straight lane geometry. As another possibility, this function may involve identifying the one or more times when the vehicle was driving in a lane having substantially-straight lane geometry based on steering-angle information for the vehicle during the given period of operation. Identifying the one or more times when the vehicle was driving in a lane having substantially-straight lane geometry may take other forms as well.

Further, in example embodiments, the lateral reference point of the vehicle may comprise a lateral center of the vehicle, and determining a respective measure of the lateral offset between the vehicle's associated sensor system and the lateral center of the vehicle for a given time within the given period of operation may involve (a) detecting at least one lane boundary of a given lane in which the vehicle was driving at the given time, (b) determining a first lateral distance between the at least one detected lane boundary and the vehicle's associated sensor system, (c) determining a second lateral distance between the at least one detected lane boundary and a lateral centerline of the given lane, and (d) based on the first lateral distance and the second lateral distance, determining the respective lateral offset between the vehicle's associated sensor system and the lateral center of the vehicle for the given time.

Further yet, in example embodiments, detecting the at least one lane boundary of the given lane in which the vehicle was driving at the given time may comprise detecting, based on an analysis of sensor data captured by the vehicle's associated sensor system at or near the given time, at least one object that is indicative of a lane boundary.

Still further, in example embodiments, identifying the one or more times when the vehicle was driving in a lane having substantially-straight lane geometry may comprise identifying at least two times when the vehicle was driving in a lane having substantially-straight lane geometry, and determining the lateral offset between the vehicle's associated sensor system and the lateral reference point of the vehicle may comprise aggregating the respective measures of the lateral offsets that are determined for the at least two identified times. In this respect, aggregating the respective measures of the lateral offsets that are determined for the at least two identified times may take various forms. As one possibility, this aggregating function may involve calculating an unweighted or weighted average of the respective measures of the lateral offsets. As another possibility, this aggregating function may involve (a) identifying a given time frame within the given period of operation during which a position of the vehicle's associated sensor system did not change relative to the vehicle, (b) identifying a subset of the at least two identified times that fall within the given time frame, and (c) aggregating the respective measures of the lateral offset for the identified subset of the at least two identified times.

In other example embodiments, the method may further involve determining a longitudinal offset between the vehicle's associated sensor system and a longitudinal reference point of the vehicle based on sensor data captured by the vehicle's associated sensor system during the given period of operation and information regarding the vehicle's physical dimensions.

In still other example embodiments, the method may further involve determining elevation information for a vertical reference point related to the vehicle during the given period of operation based on one or more of (a) map data, (b) sensor data captured by the vehicle's associated sensor system during the given period of operation, or (c) information regarding the vehicle's physical dimensions.

In another aspect, the disclosed technology may take the form of a computing system comprising at least one processor, a non-transitory computer-readable medium, and program instructions stored on the non-transitory computer-readable medium that are executable by the at least one processor such that the computing system is configured to carry out the functions of the aforementioned method.

In yet another aspect, the disclosed technology may take the form of a non-transitory computer-readable medium comprising program instructions stored thereon that are executable to cause a computing system to carry out the functions of the aforementioned method.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIG. 3I is a diagram that illustrates another example function that may be carried out as part of an example pipeline for determining a lateral offset between a vehicle's sensor system and a reference point of the vehicle in accordance with the present disclosure.

DETAILED DESCRIPTION

Figure 1:
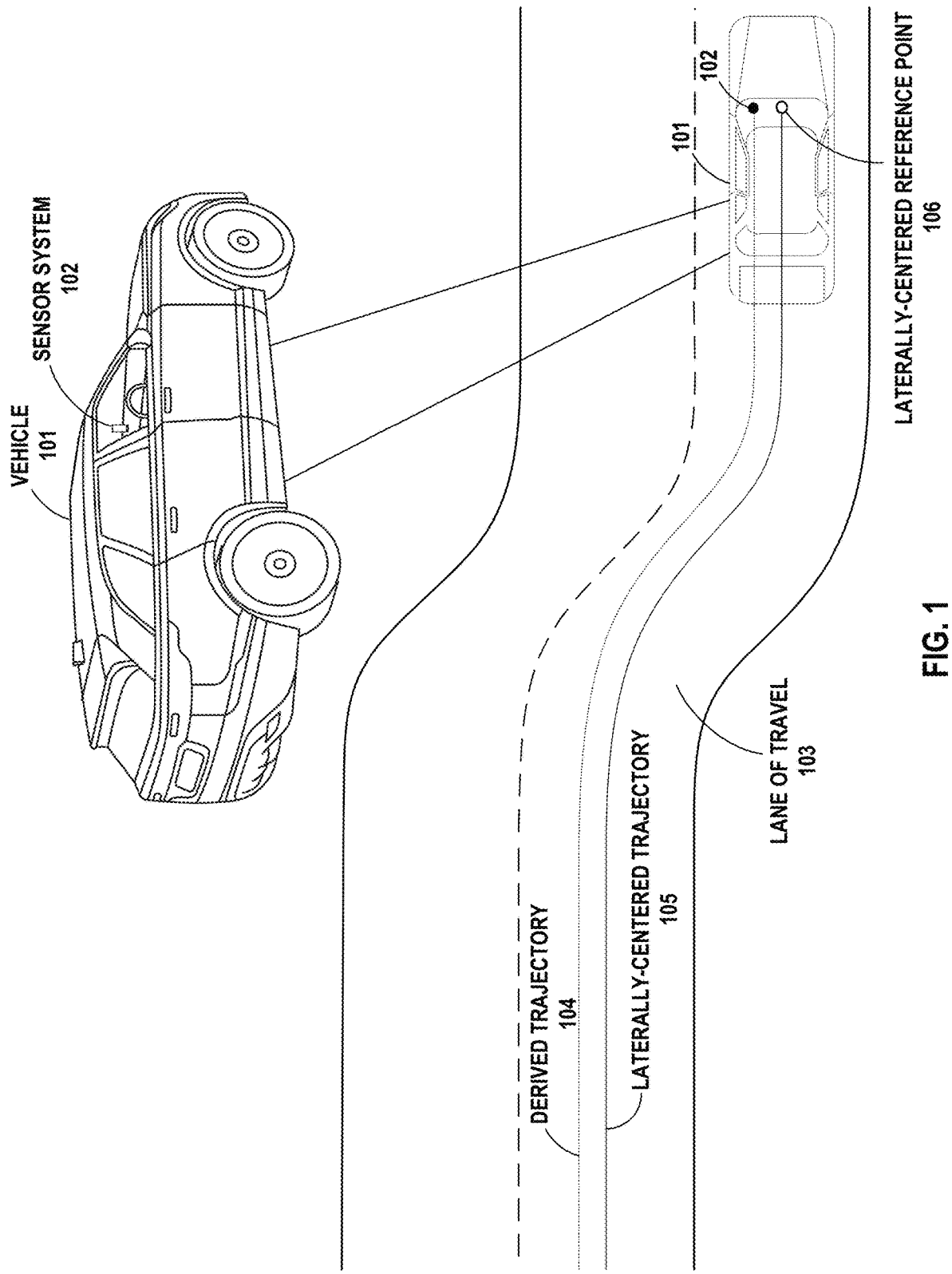
FIG. 1 is a diagram that illustrates a real-world environment where a vehicle equipped with a sensor system is engaged in collecting sensor data which may be used to derive a trajectory.

As noted above, vehicle are increasingly being equipped with sensors that capture sensor data while such vehicles are operating in the real world, such as Global Positioning System (GPS) data, Inertial Measurement Unit (IMU) data, camera image data, Light Detection and Ranging (LiDAR) data, Radio Detection And Ranging (RADAR) data, and/or Sound Navigation and Ranging (SONAR) data, among various other possibilities, and this captured sensor data may then be used for many different purposes. For instance, sensor data that is captured by sensor-equipped vehicles may be used to create maps that are representative of the real world and/or build an understanding of how vehicles and/or other types of agents (e.g., pedestrians, bicyclists, etc.) tend to behave within the real world, among other possible uses of such sensor data.

As one specific example, sensor data that is captured by sensor-equipped vehicles may be used to collect prior trajectories of vehicles or other types of agents in the real world, which can be used to help facilitate and improve various aspects of technology. (As used herein, a "trajectory" for an agent generally refers to a representation of the agent's motion and location within the real world over the course of some period of time, which may take the form of a time-sequence of position and orientation (or "pose") values for the agent, among other possibilities).

For instance, as one possibility, prior agent trajectories can be encoded into map data that is made available to on-board computing systems of vehicles (e.g., vehicles equipped with autonomy systems and/or advanced driver assistance systems), and these encoded prior agent trajectories (which may sometimes be referred to as "path priors") may then be used by the vehicles' on-board computing systems to perform various operations.

One such operation may involve planning the future behavior of a vehicle, which generally involves deriving a behavior plan for the vehicle that defines the desired driving behavior of the vehicle for some future period of time (e.g., the next 5 seconds)—including the planned trajectory of the vehicle for that future period of time. For example, to the extent that a vehicle's on-board computing system has access to prior vehicle trajectories for the road on which the vehicle is currently traveling, the vehicle's on-board computing system may use those prior vehicle trajectories during planning in order to derive a planned trajectory for the vehicle that is informed by how other vehicles have historically traversed that same road. Advantageously, using prior trajectories of vehicles in this manner may enable a vehicle's on-board computing system to plan future behavior of the vehicle that is more naturalistic than behavior that is planned based on geometric and/or semantic map data alone.

Another such operation may involve predicting the future behavior of agents surrounding a vehicle. For example, to the extent that a vehicle's on-board computing system has access to prior agent trajectories for the road on which the vehicle is currently traveling, the vehicle's on-board computing system may use those prior agent trajectories to help predict the future behavior of agents surrounding the vehicle, and this predicted behavior of the surrounding agents may then be used to inform the on-board computing system's planning of the vehicle's behavior.

On-board computing systems of vehicles may use prior agent trajectories to help facilitate other operations as well.

As another possibility, prior agent trajectories can be used to help generate other aspects of a map, one example of which may include geospatial information about the lanes within a mapped area.

As yet another possibility, prior agent trajectories can be used to help create machine learning models that are employed by on-board computing systems of vehicles during operation. For example, prior agent trajectories may be used as training data for machine learning models that may be used by a vehicle's on-board computing system to predict the future trajectories of agents detected by the vehicle's on-board computing system. As another example, prior agent trajectories may be used to identify and generate data characterizing past occurrences of certain scenario types of interest (e.g., a "cut-in" scenario where another agent cuts in front of a vehicle, an "unprotected left" scenario where a vehicle makes an unprotected left turn at an intersection, a "pedestrian ahead" scenario where a pedestrian is in a vehicle's field of view, etc.), and such data may in turn be used as training data for machine learning models that may be used by a vehicle's on-board computing system to predict which scenario types of interest (if any) are being perceived by the vehicle.

As still another possibility, prior agent trajectories can be encoded into map data for a given real-world area that is made available to a transportation-matching platform (e.g., a platform that is configured to match individuals interested in obtaining transportation with vehicles capable of providing such transportation), and such map data can then be used by the transportation-matching platform to help perform various different operations—including but not limited to matching individuals with available vehicles within the area, generating the most optimal routes for vehicles to follow when picking up and/or transporting requestors within the area, providing accurate estimates of pickup and drop-off times within the area, and/or effectively pre-positioning vehicles within the area in anticipation of responding to transportation-matching requests, among other possibilities.

It should be understood that prior trajectories of agents can also be used to improve other technology areas as well.

However, it will be appreciated that an extensive and diverse set of prior agent trajectories will generally need to be collected before the improvements described above can be achieved at scale. For example, if the goal is to encode map data with prior agent trajectories in order to help on-board computing systems of vehicles and/or transportation-matching platforms perform certain operations in a more accurate way, then before this goal can be achieved at scale, prior agent trajectories will need to be collected for an expansive array of different geographic areas. As another example, if the goal is to use prior agent trajectories to create machine learning models utilized by a vehicle's on-board computing system, then before this goal can be achieved at scale, prior agent trajectories will need to be collected for a wide range of different circumstances that could potentially be faced by a vehicle.

In this respect, one existing approach for collecting prior trajectories makes use of vehicles that have been installed with expensive, high-fidelity sensor systems, such as the types of LiDAR-based sensor systems that are installed on autonomous vehicles, which are typically comprised of a LiDAR unit combined with cameras (e.g., a 360°-camera array) and telematics sensors. As a vehicle installed with such a high-fidelity sensor system is being driven within a given area of the real world (typically by humans, but perhaps also with some level of autonomous operation), the vehicle's high-fidelity sensor system captures high-fidelity sensor data that is indicative of the movement and location of the vehicle (as well as other agents surrounding the vehicle) within the given area, and processing may then be applied to this high-fidelity sensor data in order to derive trajectory information for the vehicle (and perhaps also the other surrounding agents).

Beneficially, the trajectories that are collected in this manner typically have a very high level of accuracy. However, the total number of vehicles installed with these types of high-fidelity sensor systems that currently exist in the world is relatively small—which is due to the fact that equipping vehicles with high-fidelity sensor systems is expensive and currently provides limited practical value outside of high-fidelity data collection and autonomous driving—and these vehicles are typically only found in a limited subset of geographic areas (e.g., cities where autonomous technology is being tested). As such, prior agent trajectories cannot be collected on a large enough scale using vehicles installed with expensive, high-fidelity sensor systems alone.

Because of this, efforts are being made to develop approaches for collecting prior agent trajectories using other types of sensor systems associated with vehicles that are less expensive and/or more widely available than the types of expensive, high-fidelity sensor systems installed on autonomous vehicles. In general, these other types of sensor systems may generally comprise any system of one or more sensors, embodied in any form, that is capable of capturing sensor data and/or other localization information from which trajectory information (and/or other information) having a given level of accuracy (e.g., lane-level accuracy) can be derived—including a system comprising any one or more of a LiDAR unit, a monocular camera, a stereo camera, a GPS unit, an IMU, a SONAR unit, and/or a RADAR unit, among other possible types of sensors. One possible example of such a sensor system may take the form of a camera-based sensor system that is comprised of a monocular and/or stereo camera along with telematics sensors, which may be embodied within a device such as a smartphone, a tablet, a dashcam, or the like that can be placed somewhere within a vehicle (e.g., by being mounted on a dashboard or windshield of a vehicle). Another possible example of such a sensor system may take the form of a telematics-only sensor system comprised primarily of telematics sensors such as IMU and/or a GPS unit, which may be embodied in a device such as a smartphone, a tablet, a navigation unit, or the like that can be placed somewhere within a vehicle (e.g., by being mounted on a dashboard or windshield of a vehicle, being placed in a cupholder or tray within the center console, or simply being in the pocket of a driver or passenger within the vehicle). Other examples of sensor systems associated with vehicles are possible as well, including but not limited to lower quality and/or more portable LIDAR, RADAR, infrared images, and/or any other useful sensor packages for such applications.

As with the types of expensive, high-fidelity sensor systems that are typically installed on autonomous vehicles, collecting agent trajectories using another type of sensor system associated with a vehicle may generally involve capturing sensor data that is indicative of the movement and location of the vehicle (and perhaps other agents surrounding the vehicles) in the real world and then applying processing (e.g., localization techniques) to this captured sensor data in order to derive trajectory information for the vehicle (and perhaps also the other surrounding agents). Beneficially, collecting trajectories using these other types of sensor systems may make it possible for prior trajectories of agents to be collected on a much larger scale than an approach that relies on the types of expensive, high-fidelity sensor systems that are typically installed on autonomous vehicles or other specialized collection vehicles. Moreover, while prior agent trajectories collected using these other types of sensor systems may not necessarily be as accurate as those collected using the types of expensive, high-fidelity sensor systems that are typically installed on autonomous vehicles, it may still be possible to use such prior agent trajectories to help achieve the improvements discussed above—particularly if these other types of sensor systems enable a large enough volume of prior agent trajectories to be collected.

However, collecting prior agent trajectories using these other types of sensor systems may present additional challenges that are not likely to be presented by the types of expensive, high-fidelity sensor systems that are typically installed on autonomous vehicles. One such challenge is that, unlike with the types of expensive, high-fidelity sensor systems that are typically installed on autonomous vehicles, the specific positioning of another type of sensor system associated with a vehicle may not be known. Indeed, a high-fidelity sensor system (such as a LiDAR-based sensor system) is typically affixed to a vehicle during a controlled installation process that is carried out by a manufacturer and/or operator of a fleet of vehicles before deployment, and the specific position where the high-fidelity sensor system is affixed to each vehicle is typically measured during this controlled installation process, which provides advanced knowledge of the high-fidelity sensor system's positioning relative to the vehicle. Moreover, once installed, a high-fidelity sensor system typically remains in a fixed position relative to the vehicle throughout operation, which means that once the high-fidelity sensor system's relative positioning is measured during the controlled installation process, there is typically no need to regularly check the high-fidelity sensor system's relative positioning once the vehicle is deployed.

On the other hand, other types of sensor systems may be affixed to (or otherwise placed within) a vehicle during an uncontrolled installation process that is carried out by a driver of the vehicle, and the specific position where the sensor system is affixed to (or otherwise placed within) the vehicle is typically not measured during this uncontrolled installation process, which means that the sensor system's positioning relative to the vehicle is typically unknown. For example, such a sensor system may be embodied within a smartphone, a tablet, a dashcam, or the like that is designed to be mounted on the dashboard or windshield of a vehicle, and this mounting may be carried out by a driver of the vehicle during an uncontrolled installation process that does not involve any measurement of the specific position of the sensor system relative to the vehicle. Moreover, unlike the types of high-fidelity sensor systems discussed above, these other types of sensor systems may not necessarily have a fixed position relative to the vehicle. Rather, it is possible that a driver of a vehicle may change the positioning of a sensor system at various times and for various reasons. For example, to the extent that the sensor system is embodied within a smartphone, a tablet, a dashcam, or the like that is designed to be mounted on the dashboard or windshield of a vehicle, it is possible that a driver may periodically unmount and then re-mount such a device for various reasons (e.g., to facilitate charging or use of the device outside of the vehicle), which results in changes to the sensor system's relative positioning that are typically not measured.

This lack of knowledge regarding the specific positioning of a vehicle's sensor system relative to the vehicle itself is problematic, because the relative position of the vehicle's sensor system is typically needed in order to derive accurate trajectory information. Indeed, as noted above, the task of collecting trajectory information for a vehicle generally involves obtaining sensor data captured by the vehicle's associated sensor system during some period of time and then applying processing to the captured sensor data in order to derive a trajectory of the vehicle during that period of time. Because this sensor data is captured from the perspective of the sensor system, the processing that is applied to the captured data typically uses the positioning of the sensor system relative to the vehicle to translate the location indicated by the sensor data such that the resulting trajectory represents the location of a particular reference point within the vehicle itself (e.g., a point that is laterally centered within the vehicle such as the rear axle) rather than the location of the sensor system. However, if the positioning of the sensor system relative to the vehicle is unknown, then the resulting trajectory that is derived in this manner would be representative of the real-world location of the sensor system rather than the vehicle itself, which may degrade the accuracy of the trajectory and lead to several undesirable consequences.

For instance, consider a situation where a vehicle has an associated sensor system that is embodied in the form of a smartphone, a tablet, a dashcam, or the like that has been mounted to the far-left side of the vehicle's dashboard, which is shifted several feet to the left of the lateral centerpoint along the vehicle's dashboard. If the specific position of the sensor system relative to the lateral centerpoint along the vehicle's dashboard is unknown, then any trajectory that is derived from the sensor data captured by the sensor system would be representative of the real-world location of sensor system, and thus would be laterally shifted several feet to the left of the lateral center of the vehicle. However, because most applications operate on the assumption that a derived trajectory for a vehicle represents the motion and location of the vehicle's lateral center within the real world, such applications would likely interpret this shifted trajectory to mean that the real-world location of the vehicle was shifted several feet to the left of the actual real-world location of the vehicle, which could have several undesirable consequences—including but not limited to degrading the accuracy of a map's encoded path priors, degrading other aspects of a map that are created using trajectories, and/or degrading the accuracy of machine learning models that are trained using trajectories.

Figure 2:
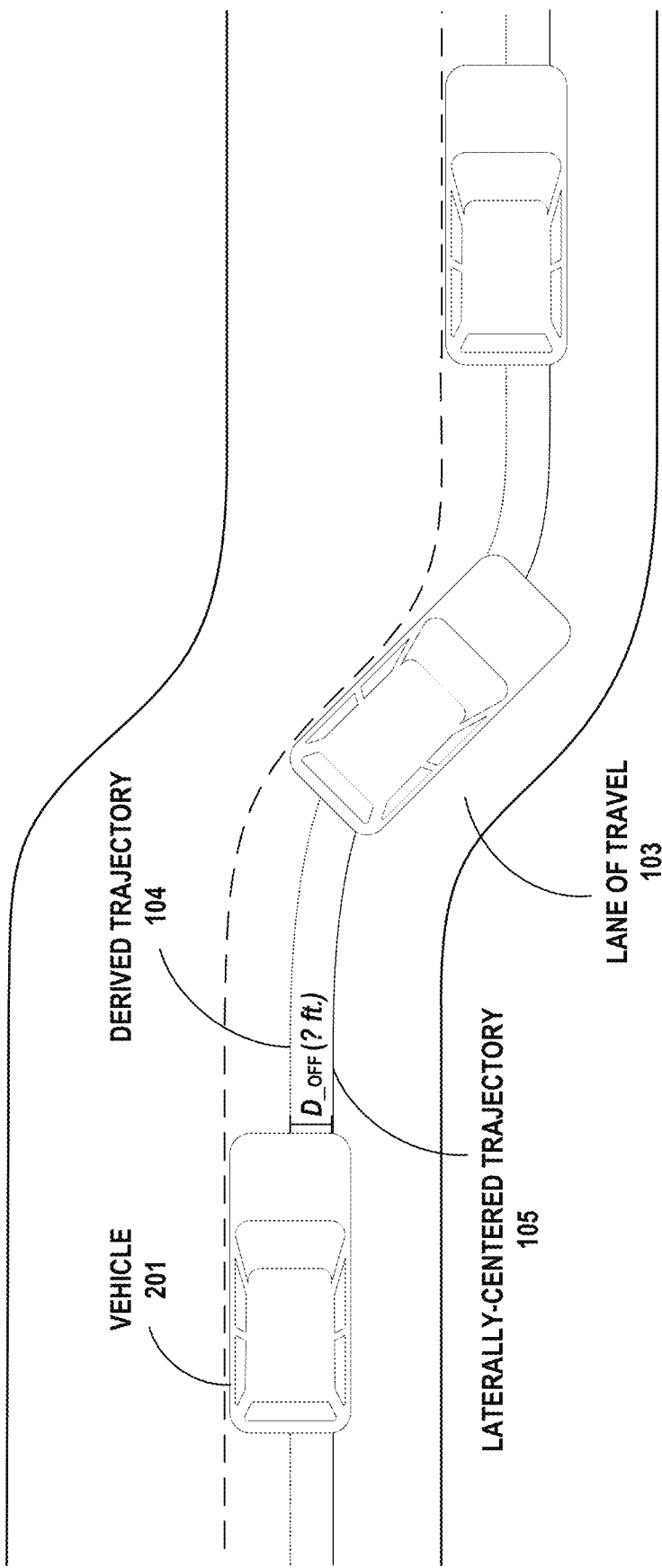
FIG. 2 is a diagram that illustrates a real-world environment where the trajectory derived in FIG. 1 is encoded as a prior trajectory to be used by a vehicle.

One illustrative example of the problems that can arise when the positioning of a vehicle's sensor system relative to the vehicle itself is unknown is shown in FIGS. 1-2. For instance, FIG. 1 illustrates an example real-world environment in which an example vehicle 101 is capturing sensor data using an associated sensor system 102. As shown, sensor system 102 may comprise a system of one or more sensors embodied in the form of a smartphone that has been mounted on the far-left side of the vehicle's dashboard. For example, in line with the discussion above, this smartphone-embodied sensor system 102 could comprise a camera-based system that is configured to capture both image data and telematics data or a telematics-only sensor system that is configured to capture telematics data only, among other possibilities.

While operating in the real-world environment, sensor system 102 of vehicle 101 may capture sensor data that is indicative of the movement and location of vehicle 101. For instance, as shown in FIG. 1, sensor system 102 of vehicle 101 may capture sensor data while vehicle 101 traverses a lane 103 within the real-world environment, and this captured sensor data may then be used to derive a trajectory for vehicle 101 that is intended to provide an accurate representation of the vehicle's motion and location while operating within the real-world environment. However, if the specific position of sensor system 102 relative to the lateral center of vehicle 101 is unknown, then the trajectory derived from the captured sensor data will be representative of the real-world location of sensor system 102—which is laterally several feet to the left of the lateral center of vehicle 101—and thus will not provide an accurate representation of the vehicle's location while operating within the real-world environment.

For instance, FIG. 1 depicts a trajectory 104 that may be derived based on sensor data captured by sensor system 102 in a situation where the specific position of sensor system 102 relative to the lateral center of vehicle 101 is unknown. In line with the discussion above, such a trajectory 104 provides a representation of the motion and location of sensor system 102 within the real-world environment, but given that sensor system 102 is not laterally centered within vehicle 101, trajectory 104 does not accurately represent the motion and location of vehicle 101 itself within the real-world environment. To illustrate this, FIG. 1 also depicts another trajectory 105 that represents the real-world motion and location of vehicle 101 in terms of a laterally-centered reference point 106 within vehicle 101, which is reflective of the fact that most applications expect a vehicle's trajectory to be expressed in terms of the vehicle's lateral center. As shown, derived trajectory 104 is shifted several feet to the left of laterally-centered trajectory 105 for vehicle 101, which can lead to undesirable consequences if derived trajectory 104 is subsequently used for the purposes described above.

For instance, if derived trajectory 104 were to be encoded into a map that is intended to be used by on-board computing systems of vehicles to carry out operations such as planning and/or prediction, this could potentially degrade the accuracy of these operations and thereby lead to undesirable driving behavior by such vehicles. One specific example of this is shown in FIG. 2, which illustrates what could happen if derived trajectory 104 were used by an on-board computing system of an example vehicle 201 that is traversing lane 103 of the real-world environment when planning the behavior of vehicle 201 within lane 103. As shown in FIG. 2, the on-board computing system of vehicle 201 is likely to assume that derived trajectory 104 represents the laterally-centered motion and location of a vehicle that previously traversed the same segment of lane 103 within the real-world environment, and thus the on-board computing system may derive a behavior plan for vehicle 201 that results in vehicle 201 laterally positioning itself within lane 103 in a manner that aligns the vehicle's lateral center with the pose values included in derived trajectory 104. However, because derived trajectory 104 is shifted several feet to the left of the laterally-centered trajectory 105 for vehicle 101, this means that vehicle 201 will traverse lane 103 in a lateral position that is shifted several feet to the left of laterally-centered trajectory 105 along which vehicle 101 had actually traversed lane 103. As a result, vehicle 201 would end up riding the left boundary of lane 103 as opposed to driving within the center of lane 103 as vehicle 101 previously had, which is likely to be considered undesirable driving behavior (particularly from the perspective of other surrounding vehicles) and largely defeats the purpose of using prior trajectories to inform the planning of vehicle behavior in the first place, which is to enable vehicles to drive in a manner that is more consistent with how other vehicles have previously driven in the real world.

Using derived trajectory 104 as the representation of the motion and location of vehicle 101 within the real-world environment could lead to various other undesirable consequences as well, including but not limited to degrading the accuracy of map aspects that are built using derived trajectory 104 and/or degrading the accuracy of machine learning models that are trained using derived trajectory 104, among other possibilities.

Similar issues may arise when attempting to use sensor data captured by vehicle-based sensor systems having unknown positions to derive other types of information that are dependent on the location of a vehicle being precisely known within a global or referential map space, examples of which may include geometric and/or semantic map data or other information about the behavior of agents within the real world.

Because of these undesirable consequences, sensor data captured by vehicle-based sensor systems that have unknown positions within such vehicles typically cannot be used for applications that require a higher level of precision, such as creating trajectories that are to be used for the purposes described above. However, this limitation on the usability of sensor data captured by vehicle-based sensor systems having unknown positions within such vehicles largely negates the primary benefit of using these other types of sensor systems, which is the ability to collect trajectories (and/or other kinds of derived information) on a much larger scale.

In view of these and other problems, disclosed herein are new techniques for determining the position of a vehicle's associated sensor system relative to the vehicle itself using data related to the vehicle's operation within a real-world environment (e.g., sensor data, map data, etc.), which may be employed in situations where the position of the vehicle's sensor system relative to the vehicle is not previously known. As described below, these techniques may allow for the determination of one or more of (i) the sensor system's lateral positioning relative to the vehicle, (ii) the sensor system's longitudinal positioning relative to the vehicle, or (iii) the sensor system's vertical positioning relative to the vehicle.

Advantageously, the disclosed techniques can be used in situations where there is a desire to capture sensor data using a vehicle-based sensor system that is affixed to (or otherwise placed within) a vehicle during an uncontrolled installation process that does not involve any measurement of the sensor system's position relative to the vehicle—such as installation of one of the types of sensor systems described above—in order to determine the position of such a sensor system relative to its associated vehicle, and then use that determined position during the processing of the sensor data captured by the sensor system to derive information that is represented from the perspective of the vehicle itself rather than from the perspective of the sensor system. In this way, the disclosed techniques may enable the sensor data captured by these types of sensor systems to be used for applications that generally require the relative positioning of a vehicle's sensor system to be known in order to achieve the requisite level of precision. For instance, when sensor data has been captured by a sensor system of a vehicle that was installed during an uncontrolled installation process, the disclosed techniques may be utilized to derive a more precise trajectory for the vehicle that is representative of the real-world motion and location of a specific reference point within the vehicle (e.g., the vehicle's lateral center) rather than the real-world motion and location of the sensor system, which may then enable the derived trajectory to be used for purposes that generally demand a higher level of precision—such as planning and/or predicting the behavior of vehicles or other agents in the real world, creating high-resolution maps, and/or training machine learning models, among other possibilities. The disclosed techniques may provide various other advantages as well.

One example of a pipeline that incorporates the disclosed technique for determining a lateral position of a vehicle's associated sensor system relative to a lateral reference point within the vehicle itself (e.g., a lateral center of the vehicle) is described with reference to FIGS. 3A-3I. In practice, this example pipeline may be implemented by any computing platform that is capable of obtaining and processing sensor data that has previously been captured by vehicle-based sensor systems having unknown positions, and one possible example of such a computing platform is described below with reference to FIG. 8.

Figure 3A:
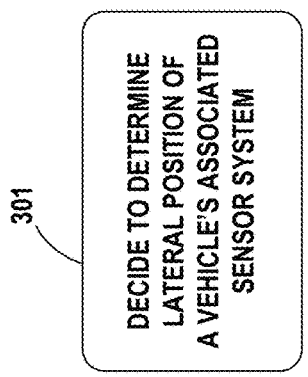
FIG. 3A is a diagram that illustrates one example function that may be carried out as part of an example pipeline for determining a lateral offset between a vehicle's sensor system and a reference point of the vehicle in accordance with the present disclosure.
Figure 3A:
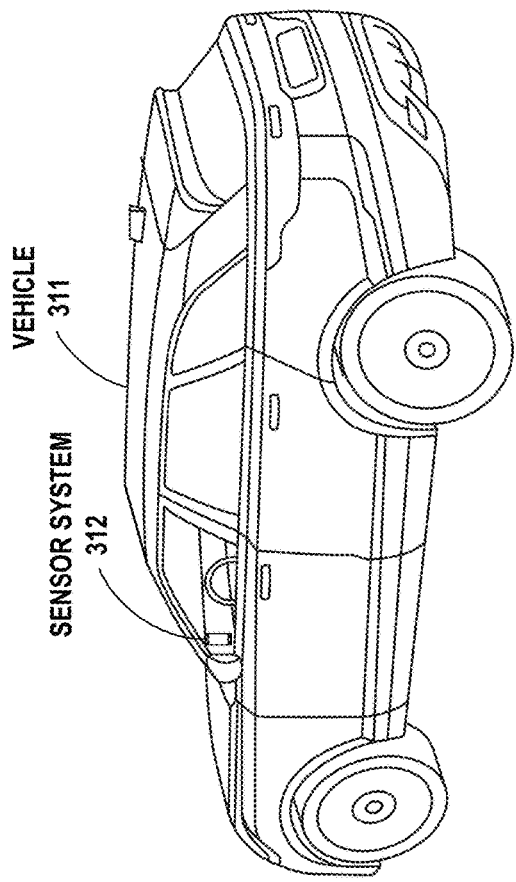

As shown in FIG. 3A, the example pipeline may be initiated at block 301 with a decision by the computing platform to apply the disclosed technique to a particular vehicle having an associated sensor system with an unknown position in order to determine a lateral position of the vehicle's sensor system relative to a lateral reference point within the vehicle itself. In this respect, the computing platform may decide to apply the disclosed technique to any vehicle that has engaged in the capture of sensor data indicative of the motion and location of the vehicle (and perhaps other surrounding agents) over some previous period of time using an associated sensor system that has an unknown lateral position relative to the vehicle. In line with the discussion above, such a sensor system may generally comprise any system of one or more sensors, embodied in any form, that is capable of capturing sensor data and/or other localization information from which trajectory information having a given level of accuracy (e.g., lane-level accuracy) can be derived—including a system comprising any one or more of a LiDAR unit, a monocular camera, a stereo camera, a GPS unit, an IMU, a RADAR unit, and/or a SONAR unit, among other possible types of sensors.

For instance, as one possibility, the computing platform may decide to apply the disclosed technique to a vehicle having an associated camera-based sensor system (e.g., a system comprising a monocular and/or stereo camera and telematics sensors) embodied in the form of a smartphone, a tablet, a dashcam, or the like that was affixed to the vehicle (e.g., by being mounted on a dashboard or windshield of the vehicle) during an uncontrolled installation process that did not involve any measurement of the lateral positioning of the camera-based sensor system.

As another possibility, the computing platform may decide to apply the disclosed technique to a vehicle having an associated telematics-only sensor system (e.g., a sensor system comprising only telematics sensors)) embodied in the form of a smartphone, a tablet, a navigation unit, or the like that was affixed to or otherwise placed within the vehicle (e.g., by being be mounted on a dashboard or windshield of the vehicle or placed within a cup holder or center console tray of the vehicle) during an uncontrolled installation process that did not involve any measurement of the lateral positioning of the telematics-only sensor system.

As yet another possibility, the computing platform may decide to apply the disclosed technique to a vehicle having an associated LiDAR-based sensor system (e.g., a sensor system comprising at least a LiDAR unit and telematics sensors) embodied in the form of a device that was affixed to the vehicle (e.g., by being mounted on the roof or hood of the vehicle) during an uncontrolled installation process that did not involve any measurement of the lateral positioning of the LiDAR-based sensor system.

The disclosed technique may be applied to vehicles having other types of associated sensor systems for capturing sensor data as well.

Further, the computing platform's decision as to whether and when to apply the disclosed technique for determining a sensor system's lateral positioning to a particular vehicle (and thereby initiate the example pipeline for the vehicle) may be based on various factors.

As one possibility, the computing system may decide to apply the disclosed technique to a particular vehicle according to a schedule (e.g., by re-running the process for determining the sensor system's lateral positioning within the vehicle daily, weekly, monthly, etc.).

As another possibility, the computing system may decide to apply the disclosed technique to a particular vehicle in response to a determination that a threshold amount of time has passed since the last determination of the sensor system's lateral positioning within the vehicle (e.g., a threshold number of hours of captured sensor data).

As yet another possibility, the computing system may decide to apply the disclosed technique to a particular vehicle in response to a determination that a threshold amount of sensor data has been captured by a vehicle's associated sensor system since the last determination of the sensor system's lateral positioning within the vehicle (e.g., a threshold number of hours of newly-captured sensor data).

As still another possibility, the computing system may decide to apply the disclosed technique to a particular vehicle in response to a determination that the relative positioning of a vehicle's sensor system appears to have changed since the last determination of the sensor system's lateral positioning within the vehicle. In this respect, some possible techniques for determining whether the relative positioning of a vehicle's sensor system appears to have changed are discussed in further detail below.

As still another possibility, the computing system may decide to apply the disclosed technique to a particular vehicle in response to a user request.

The computing platform's decision as to whether and when apply the disclosed technique for determining a vehicle-based sensor system's lateral positioning to a particular vehicle may be based on other factors as well.

To illustrate with an example, FIG. 3A shows that the computing system has decided to apply the disclosed technique for determining a vehicle-based sensor system's lateral positioning to an example vehicle 311 that has engaged in the capture of sensor data using an example sensor system 312, which is shown to take the form of a camera-based sensor system embodied in the form of a smartphone that has been mounted on the dashboard of vehicle 311 to the left side of the steering wheel.

The disclosed technique for determining a vehicle-based sensor system's lateral positioning may be applied to vehicles and sensor systems that take various other forms as well.

Figure 3B:
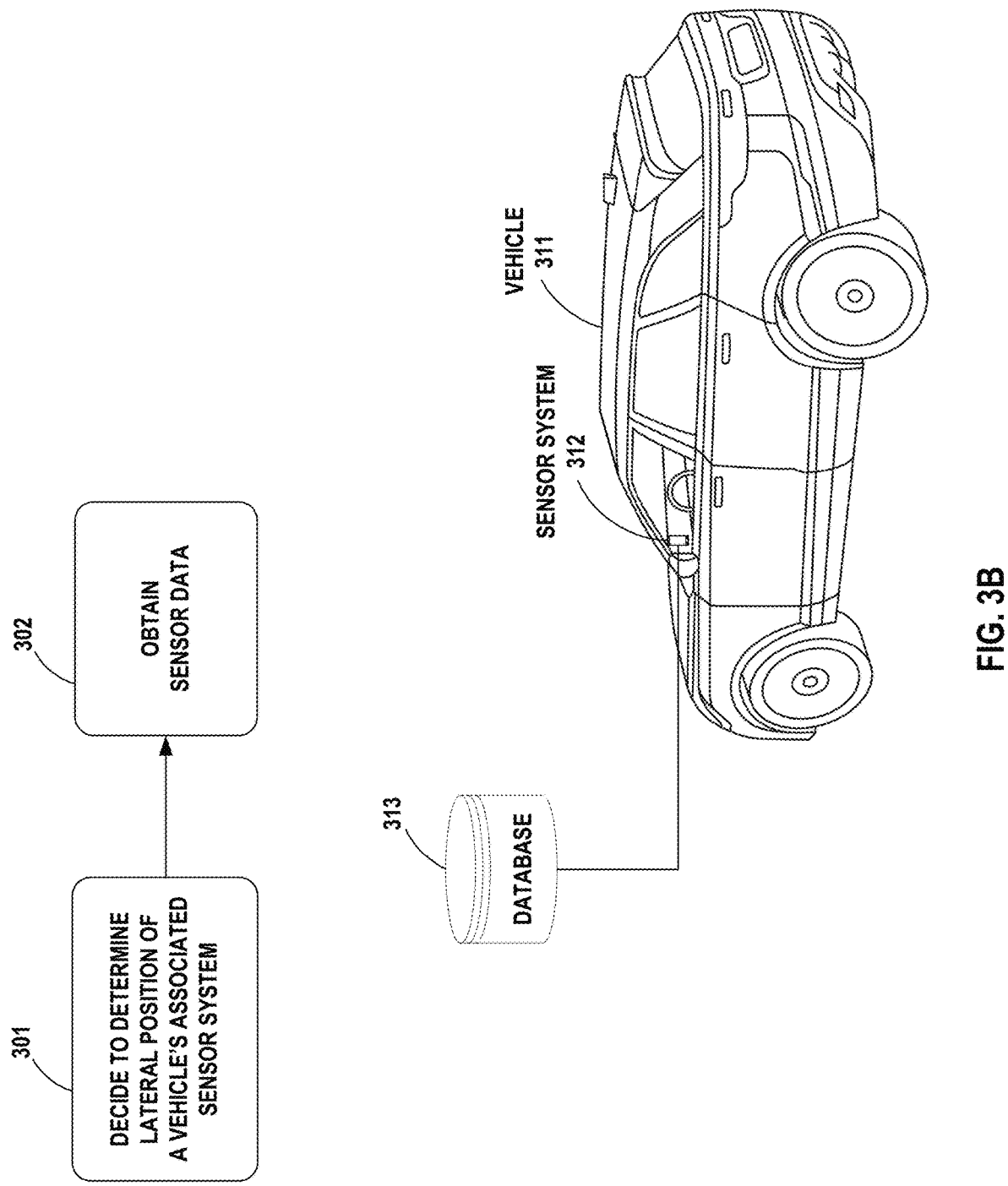
FIG. 3B is a diagram that illustrates another example function that may be carried out as part of an example pipeline for determining a lateral offset between a vehicle's sensor system and a reference point of the vehicle in accordance with the present disclosure.

Turning to FIG. 3B, at block 302, the example pipeline may next obtain sensor data captured by the vehicle's associated sensor system during a given period of time in the past. This obtained sensor data may take various forms, which may depend on the type of sensor system that is used by the vehicle to capture such sensor data. For example, if the sensor system of the vehicle comprises a camera-based sensor system, then the obtained sensor data may take the form of image data and telematics data (e.g., GPS data and/or IMU data). As another example, if the sensor system of the vehicle comprises a telematics-only sensor system, then the obtained sensor data may take the form of telematics data alone (e.g., GPS data and/or IMU data). As yet another example, if the sensor system of the vehicle comprises a LiDAR-based sensor system, then the obtained sensor data may take the form of LiDAR data, telematics data (e.g., GPS data and/or IMU data), and perhaps also image data as well. The obtained sensor data may take other forms as well.

Further, the example pipeline may obtain the sensor data captured by the vehicle in a variety of ways. In one example, the sensor data captured by the vehicle may have previously been stored into a database that is accessible by the example pipeline, in which case the example pipeline may obtain the sensor data from that database. In another example, the example pipeline may obtain the sensor data captured by the vehicle by engaging in communication with an on-vehicle computing system of the vehicle over a communication network. In yet another example, the sensor data captured by the vehicle may have previously been compiled and stored by an intermediary system, in which case the example pipeline may obtain the sensor data from such an intermediary system. It is possible the sensor data may be obtained in other ways as well.

One possible example of the function of obtaining sensor data captured by the vehicle is illustrated in FIG. 3B. As shown in FIG. 3B, the sensor data captured by sensor system 312 of vehicle 311 may be stored into a database 313 of the computing platform implementing the example pipeline, and the example pipeline may then obtain the sensor data from database 313.

The function of obtaining sensor data captured by the vehicle may take various other forms as well.

Figure 3C:
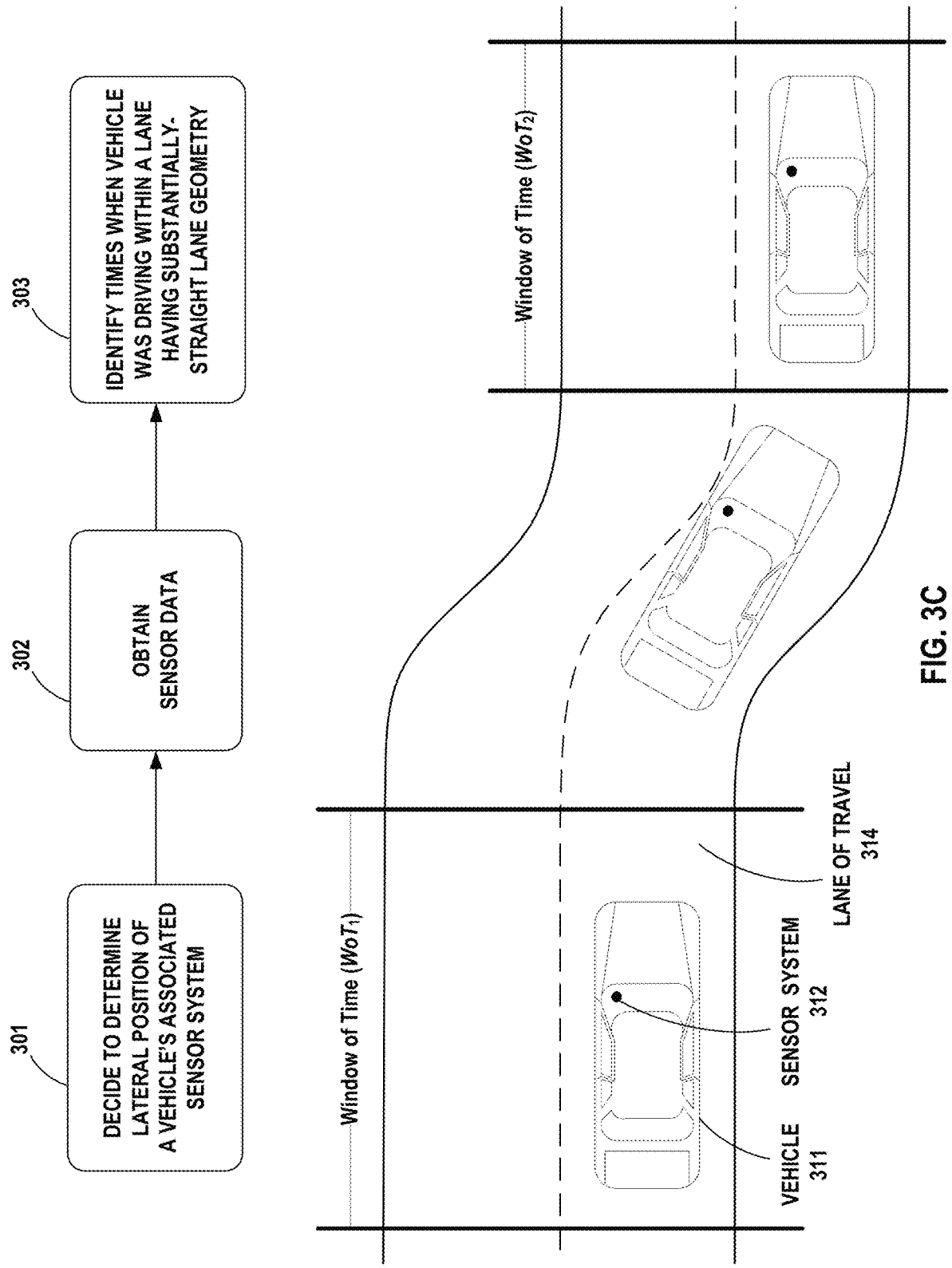
FIG. 3C. is a diagram that illustrates another example function that may be carried out as part of an example pipeline for determining a lateral offset between a vehicle's sensor system and a reference point of the vehicle in accordance with the present disclosure.

Turning to FIG. 3C, at block 303, the example pipeline may next identify times when the vehicle was driving within a lane having substantially-straight lane geometry (e.g., a lane having either no curvature or a curvature that is less than some threshold amount). These identified times may take various forms.

As one possibility, the identified times may take the form of discrete points in time during the operation of the vehicle, which may be represented according to any of various temporal reference frames—including but not limited to a temporal reference frame that corresponds to the sensor system's sampling rate. For instance, if the vehicle's sensor system is configured to capture sensor data using a sampling rate of 60 frames per second, then the identified times may comprise discrete points of time along a temporal reference frame having a time-interval scale of $\frac{1}{60}^{th}$ of a second. However, it should be understood that the discrete points in time may be represented according to temporal reference frames having various other time-interval scales as well.

As another possibility, the identified times may take the form of ranges of time during the operation of the vehicle, which may also be represented according to any of various temporal reference frames—including but not limited to a temporal reference frame that corresponds to the sensor system's sampling rate. For example, if the vehicle's sensor system is configured to capture sensor data using a sampling rate of 60 frames per second, then the identified times may comprise ranges of one or more consecutive points in time along a temporal reference frame having a time-interval scale of $\frac{1}{60}^{th}$ of a second. However, it should be understood that the ranges of time may be represented according to temporal reference frames having various other time-interval scales as well.

The times that are identified by the example pipeline at block 303 could take various other forms as well.

Further, the function of identifying the times during which the vehicle was driving within a lane having substantially-straight lane geometry may take various forms.

As one possible implementation, the example pipeline may identify the times during which the vehicle was driving within a lane having substantially-straight lane geometry using map data encoded with lane information for the roads traversed by the vehicle during the given period of time in the past, such as information about the geospatial geometry of the lanes (e.g., the shape of the lane boundaries), information about lane type, and/or information about the road signs that are applicable to the lanes, among other possibilities. For instance, in order to use map data encoded with lane information to identify times during which the vehicle was driving within a lane having substantially-straight lane geometry, the example pipeline may first perform localization on the obtained sensor data captured by the vehicle's sensor system in order to determine the sensor system's location within a map at each of various times during the given period of time in the past, and then for each respective time in the past, the example pipeline may (i) use the determined location of the sensor system within the map at the respective time to identify the lane in which the sensor system was located at the respective time, (ii) based on encoded lane information for the identified lane, determine the geometry of a respective segment of the identified lane that corresponds to the determined location of the sensor system within the map at the respective time (e.g., a segment of the identified lane that spans some distance behind and ahead of the determined location), and then (iii) evaluate whether the geometry of the respective segment of the identified lane satisfies criteria that defines whether or not a segment of a lane is considered to be substantially straight (e.g., a maximum amount of curvature within the segment of the lane). The function of using map data encoded with lane information to identify times during which the vehicle was driving within a lane having substantially-straight lane geometry may take other forms as well.

As another possible implementation, the example pipeline may identify the times during which the vehicle was driving within a lane having substantially-straight lane geometry using map data encoded with prior trajectories for the lanes traversed by the vehicle during the given period of time in the past. For instance, in order to use map data encoded with prior trajectories to identify times during which the vehicle was driving within a lane having substantially-straight lane geometry, the example pipeline may first perform localization on the obtained sensor data captured by the vehicle's sensor system in order to determine the sensor system's location within a map at each of various times during the given period of time in the past, and then for each respective time in the past, the example pipeline may (i) obtain prior trajectories of vehicles within a respective road segment that corresponds to the determined location of the sensor system within the map at the respective time (e.g., a segment of the identified lane that spans some distance behind and ahead of the determined location), and then (ii) evaluate the geometry of the obtained prior trajectories to determine whether such prior trajectories indicate that the respective road segment corresponding to the determined location at the respective time has substantially-straight lane geometry (e.g., by comparing the curvature of the prior trajectories within the road segment to a maximum amount of curvature). The function of using map data encoded with prior trajectories to identify times during which the vehicle was driving within a lane having substantially-straight lane geometry may take other forms as well.

As yet another possible implementation, the example pipeline may identify the times during which the vehicle was driving within a lane having substantially-straight lane geometry using the obtained sensor data captured by the vehicle's sensor system during the given period of time in the past. For example, the example pipeline may be able to use telematics data captured by the vehicle's sensor system as a basis for identifying windows of time during which the sensor system had little or no change in direction, and the example pipeline may then determine that the times falling within these identified windows are times during which the vehicle was driving within a lane having substantially-straight lane geometry. As another example, the example pipeline may be able to evaluate image data and/or LiDAR data captured by the vehicle's sensor system in order to detect objects in the vehicle's surrounding environment that are indicative of lane geometry, such as lane markings (e.g. painted lines), curbs, medians, concrete lane barriers, etc., and then use these detected objects as a basis for determining whether the vehicle was driving in a lane having substantially-straight lane geometry at each of various times during the given period of time in the past. In this respect, the analysis of the sensor data captured by the vehicle's sensor system may involve the use of machine learning models and/or computer-vision techniques, among other possibilities. The function of using sensor data captured by the vehicle's sensor system to identify times during which the vehicle was driving within a lane having substantially-straight lane geometry may take other forms as well.

As yet another possible implementation, the example pipeline may identify the times during which the vehicle was driving within a lane having substantially-straight lane geometry using other available data related to the operation of the vehicle during the given period of time in the past. For example, it is possible that the example pipeline may additionally have access to steering angle sensor (SAS) data for the vehicle, in which case the example pipeline may be able to use this SAS data as a basis for identifying windows of time during which the sensor system had little or no change in direction, and the example pipeline may then determine that the times falling within these identified windows are times during which the vehicle was driving within a lane having substantially-straight lane geometry. The function of using other available data related to the operation of the vehicle to identify times during which the vehicle was driving within a lane having substantially-straight lane geometry may take other forms as well.

It should also be understood that two or more of the above implementations may be used in combination in order to identify the times during which the vehicle was driving within a lane having substantially-straight lane geometry. For instance, the example pipeline may be configured to perform this identification using map data encoded with lane information as the default implementation, but if lane information is not available for certain areas that were traversed by the vehicle during the given period of time in the past, the example pipeline may then be configured to perform this identification for such areas using sensor data captured by the vehicle's sensor system within such areas and/or other available data related to the vehicle's operation within such areas. Alternatively, the example pipeline may be configured to perform this identification by evaluating some combination of map data encoded with lane information, sensor data captured by the vehicle's sensor system, and/or other available data related to the vehicle's operation (e.g., SAS data) across the given period of time in the past.

One possible example of the function of identifying the times during which the vehicle was driving within a lane having substantially-straight lane geometry is illustrated in FIG. 3C. As shown in FIG. 3C, the sensor data captured by sensor system 312 of vehicle 311 has been used to localize sensor system 312 within a map encoded with lane information, and based on the localization of sensor system 312 within that map, the example pipeline has (i) determined that vehicle 311 was driving in a right lane 314 during the illustrated time frame and (ii) identified a first Window of Time $WoT_1$ and a second Window of Time $WoT_2$ during which lane 314 had substantially-straight lane geometry during the illustrated time frame, which may in turn be used to identify particular points in time (or ranges of time) during which vehicle 311 is considered to have been driving within a lane having substantially-straight lane geometry.

The function of identifying the times when the vehicle was driving within a lane having substantially-straight lane geometry may take various other forms as well.

Notably, the reason that the example pipeline identifies times when the vehicle was driving within a lane having substantially-straight lane geometry is because historical driving behavior indicates that vehicles are likely to drive in the center of a lane having substantially-straight lane geometry. Therefore, in accordance with this historical driving behavior, the example pipeline infers that each time during which the vehicle was driving within a lane having substantially-straight lane geometry comprises a time during which the vehicle was laterally centered within the lane (i.e., a time when the lateral center of the vehicle was aligned with the lateral center of the lane), which provides a lateral reference point that can be used to derive the lateral positioning of the vehicle's sensor system.

For each identified time when the vehicle was determined to have been driving within a lane having substantially-straight lane geometry, the example pipeline may then perform a sequence of functions in order to determine a lateral offset between the vehicle's sensor system and the lateral center of the lane in which the vehicle was driving at the identified time (which as noted is assumed to represent the lateral center of the vehicle). For purposes of explanation, this sequence of functions (which is illustrated as blocks 304-307 of FIGS. 3D-3G) is described below with reference to one given time that was identified at block 303, but it should be understood that the example pipeline may carry out this sequence of functions for each identified time when the vehicle was determined to have been driving within a lane having substantially-straight lane geometry.

Figure 3D:
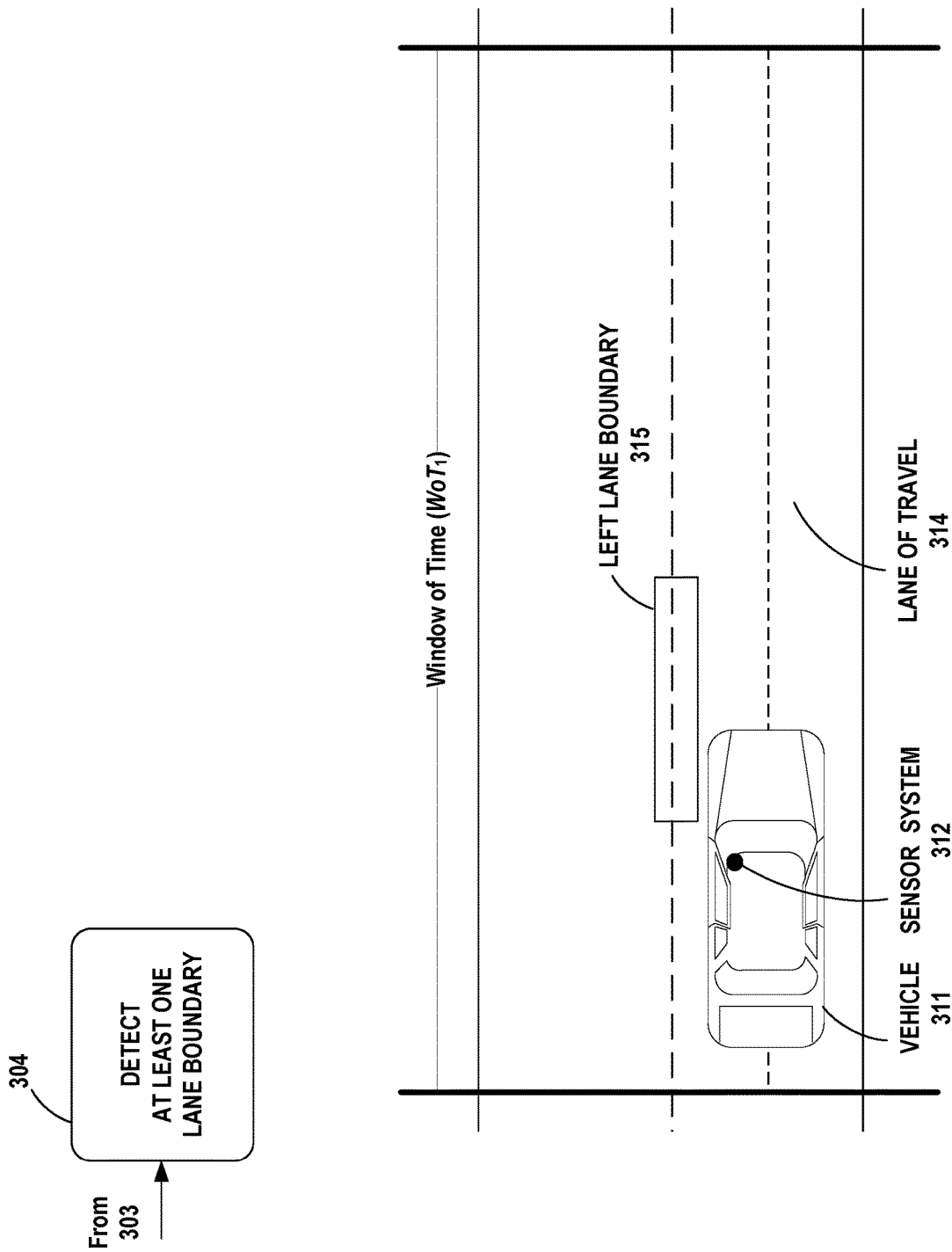
FIG. 3D is a diagram that illustrates another example function that may be carried out as part of an example pipeline for determining a lateral offset between a vehicle's sensor system and a reference point of the vehicle in accordance with the present disclosure.

Turning to FIG. 3D, at block 304, the example pipeline may detect at least one lane boundary for the lane in which the vehicle was driving at the given time. In this respect, the at least one lane boundary for which the position is determined may comprise the left lane boundary of the lane in which the vehicle was driving at the given time, the right lane boundary of the lane in which the vehicle was driving at the given time, or both the left and right lane boundaries. Further, the function of detecting the at least one lane boundary for the lane in which the vehicle was driving at the given time may take various forms.

As one possible implementation, the example pipeline may detect the at least one lane boundary for the lane in which the vehicle was driving at the given time based on the sensor data captured by the vehicle's sensor system. For instance, such a function may involve performing an analysis of the sensor data captured by the vehicle's sensor system at or around the given time in order to detect one or more objects in the vehicle's surrounding environment that are indicative of lane boundaries, such as lane markings (e.g. painted dashed yellow lines or solid white lines), lane barriers (e.g. medians or concrete lane barriers), curbs, or the like. In this respect, the analysis of the sensor data captured by the vehicle's sensor system at or around the given time may involve the use of machine learning models and/or computer-vision techniques, among other possibilities.

As another possible implementation, the example pipeline may detect the at least one lane boundary for the lane in which the vehicle was driving at the given time based on map data encoded with lane information. For instance, such a function may involve (i) performing localization on the sensor data captured by the vehicle's sensor system in order to determine the sensor system's location within a map at the given time, (ii) identify the lane in which the sensor system was located at the given time, and then (iii) based on the lane information encoded into the map for the identified lane, detect one or more lane boundaries for the identified lane.

It should also be understood that these two implementations may be used in combination in order to detect the at least one lane boundary for the lane in which the vehicle was driving at the given time. For instance, the example pipeline may be configured to perform this detection using one of the two implementations described above as the default (e.g., detecting based on sensor data), but if the example pipeline is unable to detect a lane boundary using that default implementation, the example pipeline may then be configured to perform this detection using the other of the two implementations described above as a fallback (e.g., detecting based on map data). Alternatively, the example pipeline may be configured to perform this detection by evaluating both the sensor data and the map data.

One possible example of the function of detecting the at least one lane boundary for the lane in which the vehicle was driving at the given time is illustrated in FIG. 3D. As shown in FIG. 3D, the example pipeline has performed object detection on the sensor data captured by sensor system 312 of vehicle 311 (e.g., 2D image data) at or around a given point in time within Window $WoT_1$ and has thereby detected a lane marking (e.g., a dashed painted line) that is indicative of a left lane boundary 315 of lane 314.

The function of detecting at least one lane boundary for the lane in which the vehicle was driving at the given time may take various other forms as well.

Figure 3E:
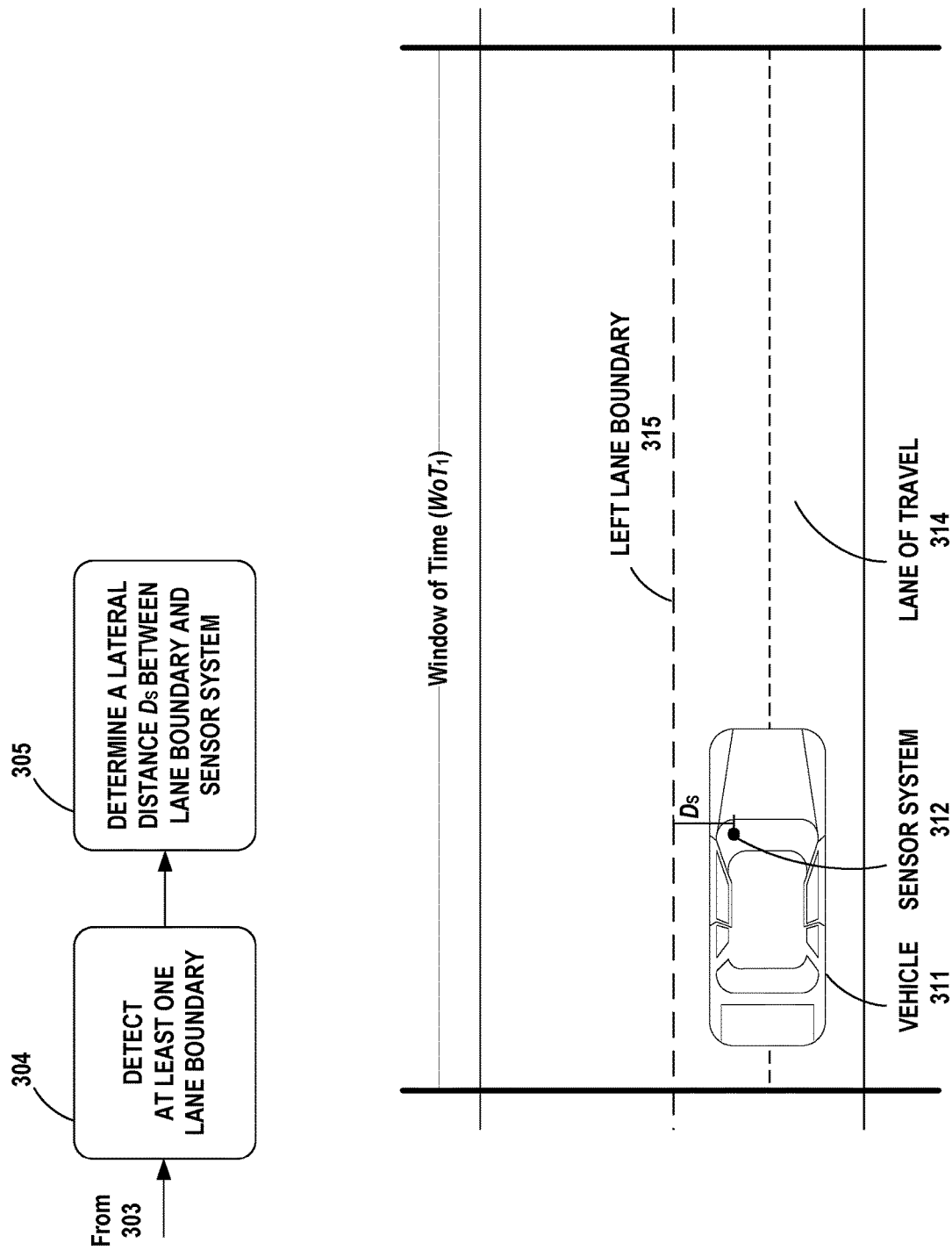
FIG. 3E is a diagram that illustrates another example function that may be carried out as part of an example pipeline for determining a lateral offset between a vehicle's sensor system and a reference point of the vehicle in accordance with the present disclosure.

Turning to FIG. 3E, at block 305, the example pipeline may then determine a lateral distance between the vehicle's sensor system and the at least one detected lane boundary at the given time. This function of determining the lateral distance between the vehicle's sensor system and the at least one detected lane boundary at the given time may take various forms.

As one possibility, in an implementation where the example pipeline detects at least one lane boundary for the lane in which the vehicle was driving at the given time by performing an analysis of the sensor data captured by the vehicle's sensor system in order to detect one or more objects in the vehicle's surrounding environment that are indicative of lane boundaries, then as part of that object detection process, the example pipeline may determine the position of the one or more detected objects relative to the vehicle's sensor system. In turn, the example pipeline may use this determined position of the one or more detected objects relative to the vehicle's sensor system to determine the lateral distance between the vehicle's sensor system and the lane boundary that is indicated by the one or more detected objects.

As another possibility, in an implementation where the example pipeline detects at least one lane boundary for the lane in which the vehicle was driving at the given time by using a map encoded with lane information, the example pipeline may also use the map encoded with lane information to determine the lateral distance between the vehicle's sensor system and the detected lane boundary at the given time. For instance, in order to determine the lateral distance between the vehicle's sensor system and the detected lane boundary using the map encoded with the lane information, the example pipeline may compare the determined location of the vehicle's sensor system within the map at the given time with the encoded location of the detected lane boundary within the map.

It should also be understood that these two implementations may be used in combination in order to determine the lateral distance between the vehicle's sensor system and the detected lane boundary at the given time. For instance, the example pipeline may be configured to perform this determination using one of the two implementations described above as the default (e.g., based on sensor data), but if example pipeline is unable to determine the lateral distance between the vehicle's sensor system and the detected lane boundary using that default implementation, the example pipeline may then be configured to perform this detection using the other of the two implementation implementations described above as a fallback (e.g., based on map data). Alternatively, the example pipeline may be configured to perform this determination by evaluating both the sensor data and the map data.

One possible example of the function of determining the lateral distance between the vehicle's sensor system and the detected lane boundary at the given time is illustrated in FIG. 3E. As shown in FIG. 3E, the example pipeline has determined a lateral distance between sensor system 312 of vehicle 311 and the detected left lane boundary 315 of lane 314 at the given point in time within Window $WoT_1$, and that lateral distance is denoted as "$D_s$."

The function of determining the lateral distance between the vehicle's sensor system and the detected lane boundary at the given time may take various other forms as well.

Figure 3F:
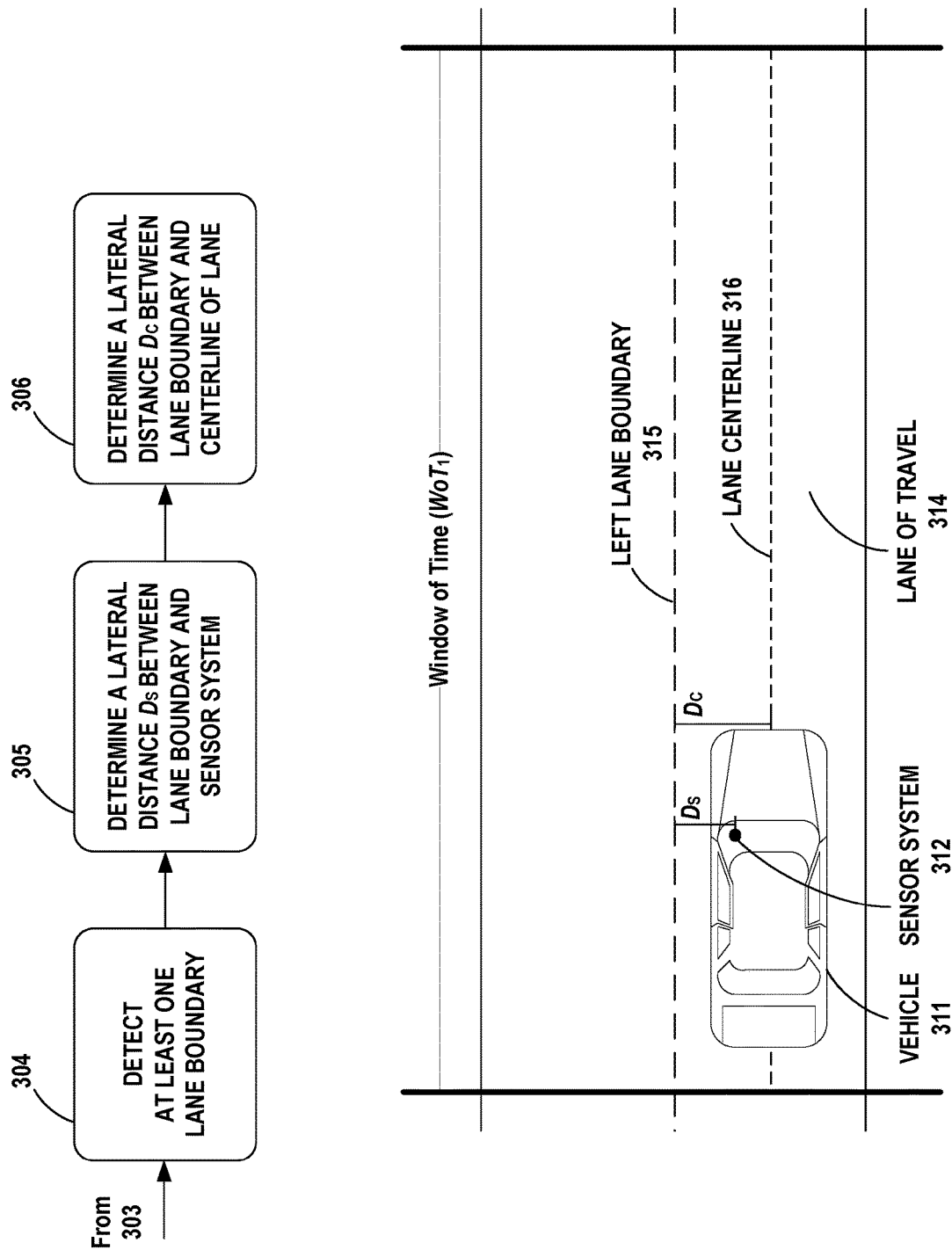
FIG. 3F is a diagram that illustrates another example function that may be carried out as part of an example pipeline for determining a lateral offset between a vehicle's sensor system and a reference point of the vehicle in accordance with the present disclosure.

Turning to FIG. 3F, at block 306, the example pipeline may next determine a lateral distance between a lateral centerline of the lane in which the vehicle was driving and the at least one detected lane boundary at the given time. This function of determining the lateral distance between the lateral centerline of the lane in which the vehicle was driving and the at least one detected lane boundary at the given time may take various forms.

In one implementation, the example pipeline may determine the lateral distance between the lateral centerline of the lane in which the vehicle was driving and the at least one detected lane boundary at the given time based on available data that is indicative of the width of the lane in which the vehicle was driving at the given time, which could be encoded into a map or could otherwise be obtained by the example pipeline (e.g., by accessing data regarding standard lane widths in geographic areas). In this respect, the function of determining the lateral distance between the lateral centerline of the lane and the detected lane boundary may involve (i) accessing the data that is indicative of the width of the lane and then (ii) dividing the width of the lane by two in order to determine the lateral distance between the lateral centerline of the lane and the detected lane boundary.

In another implementation, the example pipeline may determine the lateral distance between the lateral centerline of the lane in which the vehicle was driving and the at least one detected lane boundary at the given time based on sensor data captured by the vehicle's sensor system. For example, as part of block 304 discussed above, it is possible that the object detection performed on the sensor data captured by the vehicle's sensor system at or around the given time may result in the detection of both the left and right boundaries of the lane in which the vehicle was driving at the given time, in which case the example pipeline may have also determined the respective positions of the left and right lane boundaries relative to the vehicle's sensor system. In this respect, the function of determining the lateral distance between the lateral centerline of the lane and the detected lane boundary may involve (i) determining the lateral distance between the left and right lane boundaries based on a comparison between the determined positions of the detected left and right lane boundaries relative to the vehicle's sensor system and (ii) dividing the determined lateral distance between the detected left and right lane boundaries by two in order to determine the lateral distance between the lateral centerline of the lane and each of the detected lane boundaries.

It should also be understood that these two implementations may be used in combination in order to determine the lateral distance between the lateral centerline of the lane in which the vehicle was driving and the at least one detected lane boundary at the given time. For instance, the example pipeline may be configured to perform this determination using one of the two implementations described above as the default, but if the example pipeline is unable to determine the lateral distance between the lateral centerline of the lane in which the vehicle was driving at the given time and the detected lane boundary using that default implementation, the example pipeline may then be configured to perform this detection using the other of the two implementations described above as a fallback. Alternatively, the example pipeline may be configured to perform this determination by evaluating both the available lane-width information and the sensor data.

One possible example of the function of determining the lateral distance between the lateral centerline of the lane in which the vehicle was driving and the detected lane boundary at the given time is illustrated in FIG. 3F. As shown in FIG. 3F, the example pipeline has determined a lateral distance between a lateral centerline 316 of lane 314 and the detected left lane boundary 315 at the given point in time within Window $WoT_1$, and that lateral distance is denoted as "$D_c$."

The function of determining the lateral distance between the lateral centerline of the lane in which the vehicle was driving and the detected lane boundary at the given time may take other forms as well.

In line with the discussion above, the example pipeline may then infer that the distance between the lateral centerline of the lane in which the vehicle was driving and the detected lane boundary at the given time also comprises the distance between the lateral center of the vehicle and the detected lane boundary at the given time (which is based on the inference that a vehicle driving in a lane having substantially-straight lane geometry will be laterally centered within the lane).

Figure 3G:
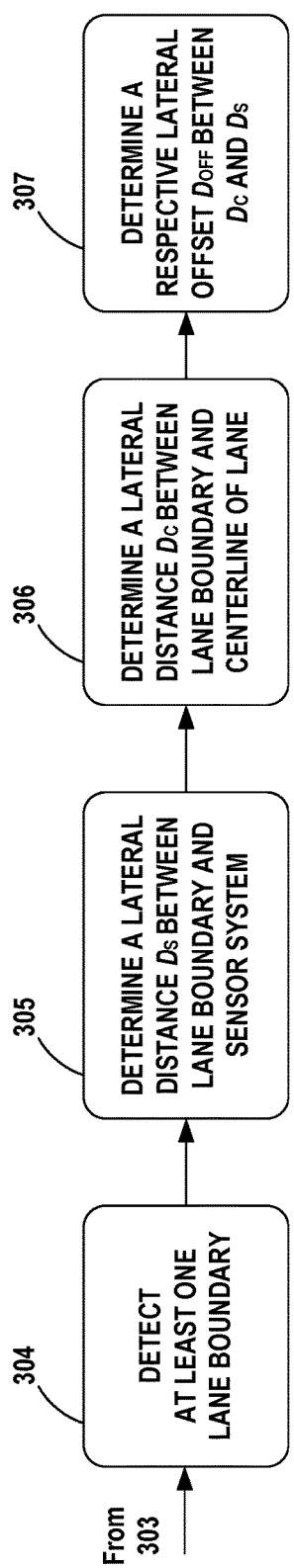
FIG. 3G is a diagram that illustrates another example function that may be carried out as part of an example pipeline for determining a lateral offset between a vehicle's sensor system and a reference point of the vehicle in accordance with the present disclosure.
Figure 3G:
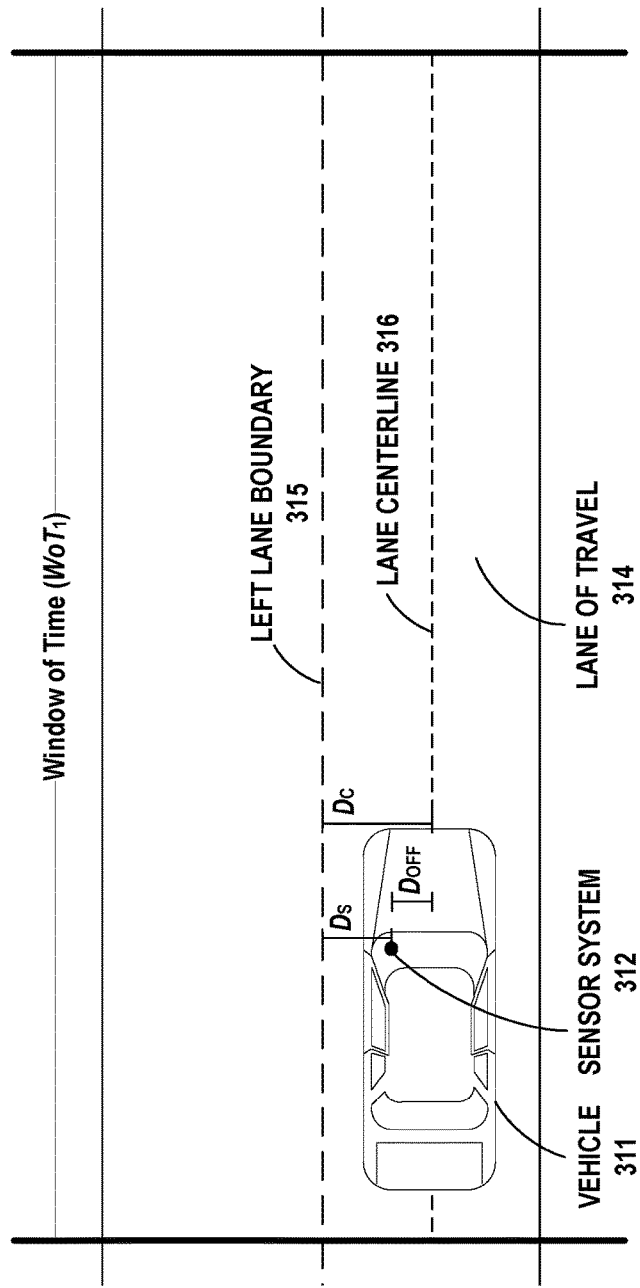

Turning to FIG. 3G, at block 307, the example pipeline may next determine a measure of the lateral offset between the vehicle's sensor system and the lateral center of the vehicle at the given time using (i) the determined lateral distance between the vehicle's sensor system and the detected lane boundary at the given time and (ii) the determined lateral distance between the lateral centerline of the lane in which the vehicle was driving and the at least one detected lane boundary at the given time. For instance, in order to determine the measure of lateral offset between the vehicle's sensor system and the lateral center of the vehicle at the given time, the example pipeline may subtract the determined lateral distance between the vehicle's sensor system and the detected lane boundary at the given time from the determined lateral distance between the lateral centerline of the lane in which the vehicle was driving and the at least one detected lane boundary at the given time.

One possible example of the function of determining a measure the lateral offset between the vehicle's sensor system and the lateral center of the vehicle at the given time is illustrated in FIG. 3G. As shown in FIG. 3G, the example pipeline may determine a measure of the lateral offset $D_{off}$ between sensor system 312 of vehicle 311 and a lateral center of vehicle 311 by subtracting (i) the lateral distance $D_s$ between sensor system 312 and detected left lane boundary 315 of lane 314, which was previously determined at block 305, from (ii) the lateral distance $D_c$ between lateral centerline 316 of lane 314 (which is inferred to represent the lateral center of vehicle 311) and detected left lane boundary 315 of lane 314, which was previously determined at block 306.

The function of determining a measure of the lateral offset between the vehicle's sensor system and the lateral center of the vehicle at the given time may take other forms as well.

In line with the discussion above, the example pipeline may repeat the sequence of functions at blocks 304-307 for each time that was identified at block 303, which may result in a respective measure of the lateral offset between the vehicle's sensor system and the lateral center of the vehicle being determined for each identified time during which the vehicle was driving within a lane having substantially-straight lane geometry. In turn, the example pipeline may use the respective measure of the lateral offset between the vehicle's sensor system and the lateral center of the vehicle that is determined for each identified time in order to determine the lateral offset between the vehicle's sensor system and the lateral center of the vehicle.

Figure 3H:
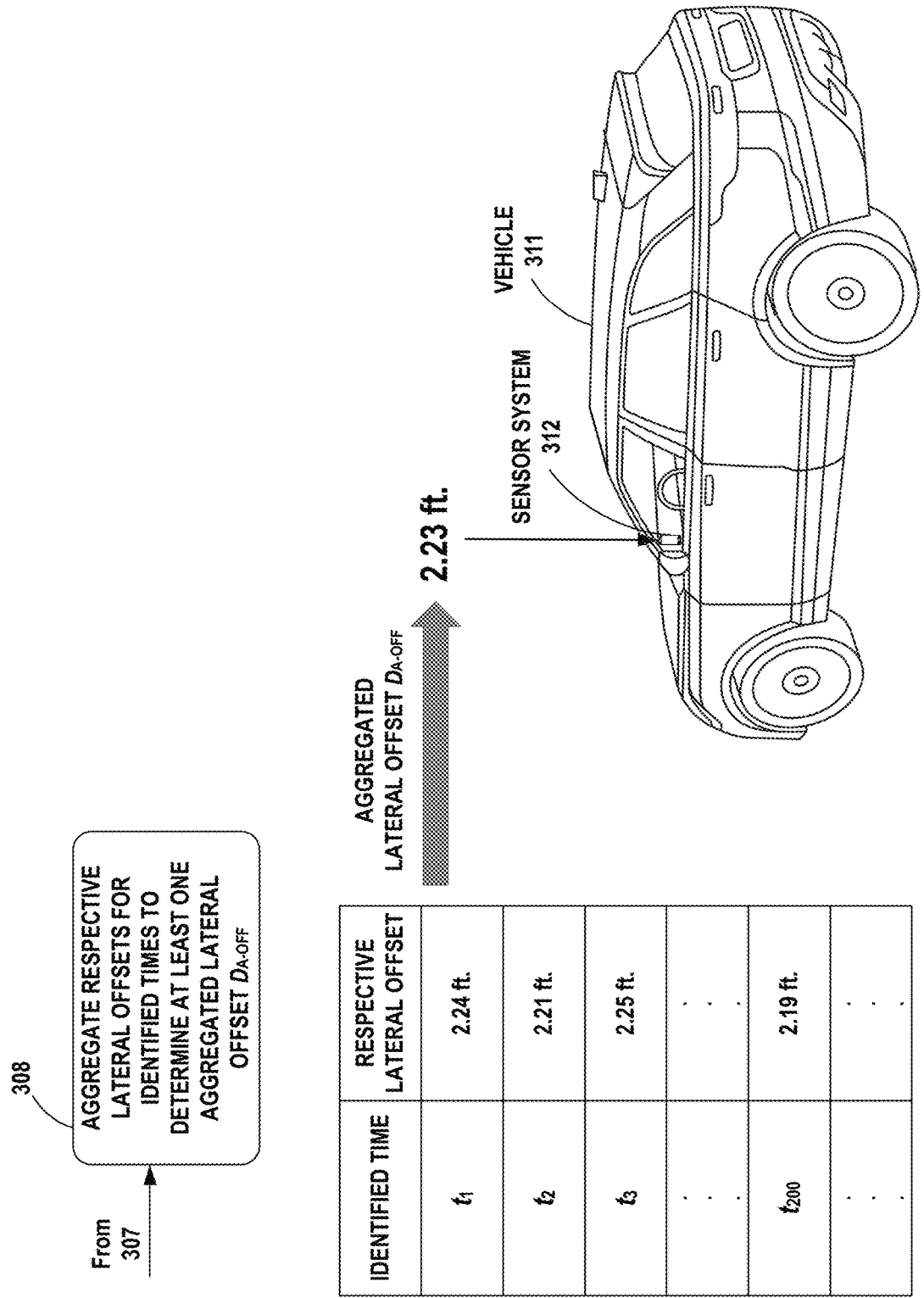
FIG. 3H is a diagram that illustrates another example function that may be carried out as part of an example pipeline for determining a lateral offset between a vehicle's sensor system and a reference point of the vehicle in accordance with the present disclosure.

For instance, turning to FIG. 3H, at block 308, the example pipeline may aggregate the respective measures of the lateral offset between the vehicle's sensor system and the lateral center of the vehicle that are determined for the times identified at block 303, which may result in the determination of at least one aggregated lateral offset between the vehicle's sensor system and the lateral center of the vehicle. This function of aggregating the respective measures of the lateral offset between the vehicle's sensor system and the lateral center of the vehicle may take various forms.

In one implementation, the function of aggregating the respective measures of the lateral offset between the vehicle's sensor system and the lateral center of the vehicle may begin with the example pipeline selecting at least one time frame for which to aggregate the respective measures of the lateral offset (each of which may be referred to herein as an "aggregation time frame"). In this respect, there are a few competing factors that should be considered when deciding on an approach for selecting the at least one aggregation time frame. One such factor to consider is that it is generally beneficial to aggregate the respective measures of the lateral offset across a larger time frame, because as the number of respective measures of the lateral offset being aggregated increases, then the accuracy of the lateral offset determined using the disclosed technique also generally increases. However, another such factor to consider is that it is possible the relative positioning of the vehicle's sensor system could change during the given period of time in the past for which the sensor data is obtained (e.g., as a result of a driver unmounting and then re-mounting the sensor system to the vehicle), and if such a change occurs, attempting to aggregate the respective measures of the lateral offset across the entire period of time in the past could produce erroneous results. In view of these factors, various different approaches for selecting the aggregation time frame may be employed.

According to one possible approach, the function of selecting the at least one aggregation time frame may involve simply selecting one aggregation time frame that matches the given period of time in the past for which the sensor data was obtained, in which case all of the respective measures of the lateral offset determined at block 307 may be aggregated together. For example, if the example pipeline obtains sensor data captured by the vehicle's sensor system during a particular period of time in the past (e.g., a particular day or a particular sequence of days during which the vehicle engaged in the capture of sensor data using its associated sensor system), the example pipeline may then function to aggregate the respective measures of the lateral offset that are determined for that entire period of time in the past. Such an approach may be employed in circumstances where there is a relatively low likelihood of the sensor system changing position relative to the vehicle during the given period of time in the past, which may be dictated by factors such as the type of sensor system and/or the length of the given period of time in the past, among other possibilities.

According to another possible approach, the function of selecting the at least one aggregation time frame may involve segregating the given period of time in the past into multiple, discrete "sessions" of data capture activity by the vehicle's sensor system (which may also be referred to herein as "collection runs") and then designating each of these discrete sessions as a separate aggregation time frame. In this respect, the discrete sessions of data capture activity may take various forms.

For example, the discrete sessions of data capture activity may be defined in terms of days, such that each different day of data capture activity is considered a different session of data capture activity and thus designated as a separate aggregation time frame—in which case the respective measures of the lateral offset would be aggregated on a day-by-day basis. Such an approach may be employed in circumstances where there is a relatively low likelihood of the sensor system changing position relative to the vehicle during the course of any given day, but there is a reasonable likelihood of the sensor system changing position relative to the vehicle between days.

As another example, the discrete sessions of data capture activity may be defined in terms of time frames during which the vehicle's sensor system engaged in relatively-continuous data capture activity. For example, on a given day, the vehicle's sensor system may have engaged in multiple different "shifts" of relatively-continuous data capture activity (e.g., a first shift from 9 am to 11 am, a second shift of relatively-continuous data capture from 1 pm to 4 pm, and a third shift of relatively-continuous data capture from 7 pm to 11 pm), in which case the example pipeline may designate each of these different shifts of relatively-continuous data capture activity as a separate aggregation time frame and the respective measures of the lateral offset may be aggregated on a shift-by-shift basis. Such an approach may be employed in circumstances where there is a reasonable likelihood of the sensor system changing position relative to the vehicle between different sessions during the course of a given day.

In accordance with this approach, the example pipeline's segregation of the given period of time in the past into multiple, discrete sessions of data capture activity may be based on an analysis of the sensor data captured by the vehicle's sensor system and/or other available data related to the operation of the vehicle during the given period of time in the past.

According to yet another possible approach, the function of selecting the at least one aggregation time frame may involve (i) performing an analysis of whether the position of the sensor system relative to the vehicle appears to have changed at any point during the given period of time in the past (e.g., based on the sensor data captured by the vehicle's sensor system during the given period of time in the past and/or the respective measures of the lateral offset that have been determined), and (ii) to the extent it is determined that the position of the sensor system relative to the vehicle appears to have changed at one or more points during the given period of time in the past, using that determination as a basis for segregating the given period of time in the past into two or more separate aggregation time frames. In this respect, the function of determining that the position of the sensor system relative to the vehicle appears to have changed at some point during the given period of time in the past may take various forms.

One way of determining that the position of the sensor system relative to the vehicle appears to have changed at some point during the given period of time in the past may involve performing an analysis of the sensor data captured by the vehicle's sensor system in order to identify any points during the given period of time in the past when the sensor system appears to have moved in a manner that is inconsistent with how a vehicle would be expected to move. For instance, one possible example of this type of movement by the sensor system may comprise movement in an almost-entirely lateral direction, which is generally not possible for a vehicle, and thus would be indicative of a point during the given period of time in the past when the position of the sensor system relative to the vehicle appears to have changed (e.g., due to the driver unmounting the sensor system from the vehicle).

Another way of determining that the position of the sensor system relative to the vehicle appears to have changed at some point during the given period of time in the past may involve performing an analysis of the sensor data captured by the vehicle's sensor system to determine whether the position of the sensor system relative to the vehicle appears to have changed between the end of one discrete session of data capture activity and the beginning of another discrete session of data capture activity. For instance, the example pipeline may perform this analysis by comparing (i) the last one or more frames of sensor data captured by the vehicle's sensor system at the end of one session of data capture activity and (ii) the first one or more frames of sensor data captured by the vehicle's sensor system at the beginning of a subsequent session of data capture activity, in order to look for any changes in these two sets of sensor data that may be indicative of movement of the sensor system relative to the vehicle between sessions. In this respect, if the example pipeline's analysis of these two sets of sensor data indicates that the same detected objects are in the same positions between the two sets of sensor data, the example pipeline may determine that the position of the sensor system relative to the vehicle has not changed between the two sessions. On the other hand, if the example pipeline's analysis of these two sets of sensor data indicates that the same objects are detected but they are now in different positions between the two sets of sensor data (or there are different objects detected altogether), the example pipeline may determine that the position of the sensor system relative to the vehicle has changed between the two sessions.

To illustrate, consider an example where a last frame of image data captured at the end of one session shows the right half of a garage door directly in front of the sensor system and a partial view of a tree branch to the right of the sensor system. If a first frame of image data captured at the beginning of a next session shows this same set of objects in the same positions, the example pipeline may determine that the position of the sensor system relative to the vehicle has not changed. On the other hand, if the first frame of image data captured at the beginning of the next session shows the left half of the garage door and a partial view of a front door to the left of the sensor system, the example pipeline may determine that the position of the sensor system relative to the vehicle has been shifted to the left.

Yet another way of determining that the position of the sensor system relative to the vehicle appears to have changed at some point during the given period of time in the past may involve (i) segregating the given period of time in the past into multiple, discrete sessions of data capture activity by the vehicle's sensor system (which as noted above may take the form of day, sessions of relatively-continuous capture activity, etc.), (ii) aggregating the respective measures of the lateral offset determined at block 307 on a session-by-session basis (e.g., by calculating an unweighted or weighted average of the respective measures of the lateral offset for identified times associated with a given session), which may produce a respective, aggregated lateral offset for each different session of data capture activity, and (iii) perform a comparison between the respective, aggregated lateral offsets for the different sessions of data capture activity in order to evaluate whether there are any meaningful differences between the respective, aggregated lateral offsets for the different sessions of data capture activity. In this respect, if the example pipeline does not identify any meaningful differences between the respective, aggregated lateral offsets for two consecutive sessions of data capture activity, the example pipeline may determine that the position of the sensor system relative to the vehicle did not change between the two sessions. On the other hand, if the example pipeline does identify a meaningful difference between the respective, aggregated lateral offsets for two consecutive sessions of data capture activity (e.g., a difference of 5% or more), the example pipeline may determine that the position of the sensor system relative to the vehicle did change between the two sessions.

The function of determining that the position of the sensor system relative to the vehicle appears to have changed at some point during the given period of time in the past may take other forms as well.

After determining that the position of the sensor system relative to the vehicle appears to have changed at one or more points during the given period of time in the past, the example pipeline may then segregate the given period of time in the past at the one or more points, which may produce two or more separate aggregation time frames, and the respective measures of the lateral offset may then be grouped and aggregated in accordance with these two or more separate aggregation time frames.

The function of selecting the at least one aggregation time frame for which to aggregate the respective measures of the lateral offset may take other forms as well.

After selecting the at least one aggregation time frame, then for each such aggregation time frame, the example pipeline may aggregate the respective measures of the lateral offset for identified times that fall within the aggregation time frame. For instance, if the at least one aggregation time frame comprises a single aggregation time frame that matches the given period of time in the past, then the example pipeline may aggregate all of the respective measures of the lateral offset determined at block 307 into a single, aggregated lateral offset. Alternatively, if the at least one aggregation time frame comprises multiple different aggregation time frames within the given period of time in the past, then for each such aggregation time frame, the example pipeline may function to (i) identify a subset of the identified times that fall within the aggregation time frame and then (ii) aggregate the respective measures of the lateral offset that are determined at block 307 for the identified subset of identified times into a respective aggregated lateral offset for the aggregation time frame. In this respect, the function of aggregating the respective measures of the lateral offset for identified times that fall within an aggregation time frame may take various forms.

As one possibility, the function of aggregating the respective measures of the lateral offset for identified times that fall within an aggregation time frame may involve calculating an unweighted average of these respective measures of the lateral offset.

As another possibility, the function of aggregating the respective measures of the lateral offset for identified times that fall within an aggregation time frame may involve calculating a weighted average of these respective measures of the lateral offset. In this respect, the weights that are assigned to the respective measures of the lateral offset for purposes of this weighted averaging function may be based on various factors, examples of which may include confidence metrics associated with the sensor data that was used to determine the respective measures of the lateral offset. For instance, in an implementation where the example pipeline detects the at least one lane boundary by performing object detection on sensor data captured by the vehicle's sensor system in order to detect one or more objects that are indicative of lane boundaries, that object detection process may return a confidence metric associated with each detected object that represents the probability of the object being accurately detected, and such a confidence metric may be used during the weighting of the lateral offsets. For example, if the detection of an object that is indicative of a lane boundary at a given identified time returns a lower confidence metric (e.g., 40%), the individual lateral offset may be assigned a lower weight for purposes of the weighted averaging function. On the other hand, if the detection of an object that is indicative of a lane boundary at a given identified time returns a higher confidence metric (e.g., 90%), the individual lateral offset may be assigned a higher weight for purposes of the weighted averaging function. The weights that are assigned to the respective measures of the lateral offset for purposes of this weighted averaging function may be based on various other factors as well.

As yet another possibility, the function of aggregating the respective measures of the lateral offset for identified times that fall within an aggregation time frame may involve a two-phase approach. In the first phase, the example pipeline may (i) group the identified times into discrete windows of consecutive times during which the vehicle was driving within a lane having straight lane geometry and (ii) aggregate the respective measures of the lateral offset on a window-by-window basis (e.g., by taking an unweighted or weighted average of the respective measures of the lateral offset), which may result in respective, aggregated lateral offset for each window. Then, in the second phase, the example pipeline may aggregate the individual respective, aggregated lateral offsets for the identified windows (e.g., by taking an unweighted or weighted average of the respective, aggregated lateral offsets) in order to determine an overall, aggregated lateral offset for the aggregation time frame.

The function of aggregating the respective measures of the lateral offset for identified times that fall within an aggregation time frame may take various other forms as well, including but not limited to the possibility that certain measures of the lateral offset that are determined at block 307 could be removed before the aggregation is applied (e.g., outlier values).

One possible example of the function of aggregating the respective measures of the lateral offset between the vehicle's sensor system and the lateral center of the vehicle that are determined for the times identified at block 303 is illustrated in FIG. 3H. As shown in FIG. 3H, the example pipeline may calculate an unweighted or weighted average of respective measures of the lateral offset $D_{OFF}$ for identified times that fall within a selected aggregation time frame (e.g., the given period of time in the past or some sub-period thereof) and thereby determine an aggregated lateral offset $D_{A-OFF}$ of 2.23 feet for the aggregation time frame, which may then be used to represent the lateral position of sensor system 312 relative to the lateral center of vehicle 311 during the aggregation time frame.

This function of determining the lateral offset between the vehicle's sensor system and the lateral center of the vehicle based on the respective measures of the lateral offset that are determined at block 307 may take other forms as well—including but not limited to the possibility that as little as one single measure of the lateral offset could form the basis for the determined lateral offset (e.g., in a situation where only a single time is identified at block 303).

Turning to FIG. 3I, at block 309, after determining at least one aggregated lateral offset between the vehicle's sensor system and the lateral center of the vehicle, the example pipeline may then use the at least one aggregated lateral offset during the course of deriving a trajectory for the vehicle from the sensor data captured by the selected sensor's sensor system. The manner in which the at least one aggregated lateral offset is used during the course of deriving the trajectory for the vehicle may take various forms.

As one possibility, the example pipeline may first apply a processing technique such as simultaneous localization and mapping (SLAM) to the original sensor data captured by the vehicle's sensor system during the given period of time, which may produce a trajectory that represents the real-world motion and location of the sensor system during the given period of time in the past, and the example pipeline may then use the at least one aggregated lateral offset to translate the derived trajectory (which may take the form of a time-sequence of pose values) such that it represents the real-world motion and location of the vehicle's lateral center instead of the vehicle's sensor system.

As another possibility, the example pipeline may first use the at least one aggregated lateral offset to translate the sensor data captured by the vehicle's sensor system during the given period of time such that it indicates motion and location from the perspective of the vehicle's lateral center rather than from the sensor system, and the example pipeline may then apply a processing technique such as SLAM to the translated sensor data, which may produce a trajectory that represents the real-world motion and location of the vehicle itself during the given period of time in the past.

One possible example of the function of using the at least one aggregated lateral offset during the course of deriving the trajectory for the vehicle is illustrated in FIG. 3I. As shown in FIG. 3I, the example pipeline has first applied a processing technique such as SLAM to the sensor data captured by sensor system 312 of vehicle 311, which may produce a derived trajectory 317 that represents the real-world motion and location of sensor system 312 during the illustrated time frame. In turn, the example pipeline may use the aggregated lateral offset $D_{A-OFF}$ of 2.23 feet that was determined at block 308 to translate derived trajectory 317 into a laterally-centered trajectory 318 that represents the real-world motion and location of the lateral center of vehicle 311, which may involve laterally shifting each pose value included in derived trajectory 317 by a distance of 2.23 feet to the right (i.e., towards the lateral center of vehicle 311).

The function of using the at least one aggregated lateral offset during the course of deriving the trajectory for the vehicle may take other forms as well.

Advantageously, this example pipeline may be used in a similar manner to derive a trajectory for any vehicle having an associated sensor system with an unknown position relative to the vehicle itself, such camera-based sensor systems, telematics-only sensor systems, or perhaps even certain types of LiDAR-based sensor systems that are affixed to vehicles by the drivers of such vehicles. In this way, the example pipeline may be utilized to derive a more precise trajectory for the vehicle that is representative of the real-world motion and location of the vehicle's lateral center rather than the real-world motion and location of the sensor system, which may then enable the derived trajectory to be used for purposes that generally demand a higher level of precision, such as planning and/or predicting the behavior of vehicles or other agents in the real world, creating high-resolution maps, and/or training machine learning models, among other possible uses of such trajectories.

Further, in line with the discussion above, it is possible that the at least one aggregated lateral offset determined at block 308 could be used during the course of deriving other kinds of information as well, including but not limited to geometric and/or semantic map information or other information about the behavior of agents within the real world.

It should be understood that FIGS. 3A-3I merely illustrate one possible implementation of the disclosed technique for determining a lateral position of a vehicle's sensor system relative to a lateral reference point within the vehicle itself, and that the disclosed technique may be implemented in various other manners as well, including the possibility that illustrated functions may be added, removed, rearranged into different orders, combined into fewer functions, and/or separated into additional functions, depending upon the particular implementation.

For instance, while the functions are described above in the context of an example pipeline that may be implemented by a remote computing platform that is capable of obtaining and processing sensor data that has previously been captured by vehicle-based sensor systems having unknown positions, it should be understood that the example pipeline described above may also be adapted in a manner that allows the pipeline to be implemented by an on-board computing system of a vehicle during the course of capturing sensor data.

In such an implementation, the on-board computing system of a vehicle may be configured to apply the disclosed technique in real-time, determining a lateral offset between the vehicle's sensor system and lateral center and applying the offset to a derived trajectory (or other derived information) while the vehicle's sensor system is currently in the process of capturing sensor data. To facilitate this functionality, the on-board computing system of a vehicle may implement an alternate version of the example pipeline described above that includes similar functions to those described with reference to FIGS. 3A-3I.

In this alternate version of the example pipeline, the on-board computing system of a vehicle may begin obtaining sensor data on a running basis as that sensor data is being captured by the vehicle's sensor system, which may take any of the forms discussed above with respect to block 302.

As the on-board computing system of the vehicle is obtaining the sensor data being captured by the vehicle's sensor system on a running basis, the on-board computing system may also determine whether or not the vehicle is currently driving within a lane having substantially-straight lane geometry (e.g., a lane having either no curvature or a curvature that is less than some threshold amount). In this respect, the on-board computing system may determine whether or not the vehicle is currently driving within a lane having substantially-straight lane geometry in a similar manner to how the example pipeline identifies the times when the vehicle was driving within a lane having substantially-straight lane geometry at block 303 (e.g., based on an analysis of map data encoded with lane information, sensor data captured by the vehicle's sensor system, and/or other available data related to the vehicle's operation).

When the on-board computing system of the vehicle determines that the vehicle is driving within a lane having substantially-straight lane geometry, the on-board computing system may then begin to iterate through a sequence of functions that are similar to the functions described above with reference to block 304-307 according to some frequency, which could either be the same as the frequency used to capture the sensor data (e.g., 60 frames per second) or some other frequency. For instance, during each iteration of the sequence of functions, the on-board computing system of the vehicle may (i) detect at least one lane boundary for the lane in which the vehicle is currently driving, (ii) determine a lateral distance between the vehicle's sensor system and the at least one detected lane boundary, (iii) determine a lateral distance between a lateral centerline of the lane in which the vehicle is driving and the at least one detected lane boundary, and (iv) determine a respective measure of the lateral offset between the vehicle's sensor system and the lateral center of the vehicle.

After some threshold number of respective measures of the lateral offset between the vehicle's sensor system and the lateral center of the vehicle have been determined, the on-board computing system of the vehicle may then begin to aggregate the respective measures of the lateral offset together on a running basis. For instance, after a threshold number of respective measures of the lateral offset have been determined in the manner described above, the on-board computing system of the vehicle may determine an initial, aggregated lateral offset based on the initial set of respective measures of the lateral offset that are available (e.g., by calculating an unweighted or weighted average of such lateral offsets). Then, as each subsequent individual lateral offset is determined, the on-board computing system of the vehicle may update the running, aggregated lateral offset to account for the newly-determined individual lateral offset. The on-board computing system of the vehicle may aggregate the respective measures of the lateral offset together in some other manner as well, including but not limited to the possibility that the on-board computing system may wait until a given session of data capture activity has been completed and then aggregate all the respective measures of the lateral offset determined for the given session of data capture activity using one of the approaches described above with reference to block 308.

Lastly, the on-board computing system of the vehicle may use the aggregated lateral offset during the course of deriving a trajectory for the vehicle. In this respect, the on-board computing system of the vehicle may be configured to either (i) derive the trajectory for the vehicle on a running basis as the sensor data is captured by the vehicle's sensor system or (ii) wait until a given session data capture activity has been completed and then derive the trajectory at that time.

The disclosed technique for determining a lateral position of a vehicle's sensor system relative to a lateral reference point within the vehicle itself and then using that lateral position to derive a trajectory for the vehicle could take various other forms as well.

In some cases, it may be sufficient to determine and use the lateral position of a vehicle's sensor system relative to the vehicle when deriving the trajectory of the vehicle, while leaving the trajectory of the vehicle defined in terms of the longitudinal position of the sensor system. However, in other cases, it may also be desirable to define the trajectory of the vehicle in terms of a specific longitudinal reference point within the vehicle, such as the real axle of the vehicle or the longitudinal center of the vehicle. In this respect, disclosed herein are also techniques for determining a longitudinal position of a vehicle's sensor system relative to a longitudinal reference point within the vehicle itself, which may also be used during the course of deriving a trajectory for the vehicle. These techniques may take various forms.

According to a first implementation of the disclosed technique, a longitudinal position of a vehicle's sensor system relative to a given longitudinal reference point of the vehicle may be determined by (i) detecting a fixed point of the vehicle that is perceivable by the vehicle's sensor system, (ii) determining a first longitudinal distance between the fixed point and the vehicle's sensor system, (iii) determining a second longitudinal distance between the fixed point and the given longitudinal reference point, and then (iv) based on the first and second longitudinal distances, determining a longitudinal offset between the sensor system and the given longitudinal reference point. Each of these functions may take various forms.

For instance, the fixed point of the vehicle may take various forms and be detected in various ways. As one possibility, a fixed point of the vehicle may take the form of a given point on the vehicle's hood (e.g., a laterally-centered point on the far edge of the hood), and that fixed point may be detected by performing an analysis of the sensor data captured by the vehicle's sensor system (e.g., using semantic segmentation techniques or the like) in order to detect that fixed point within the sensor data. The fixed point of the vehicle may take various other forms and be detected in various other ways as well.

Next, the first longitudinal distance between the fixed point and the vehicle's sensor system may be determined in various manners, including but not limited to the possibility that the first longitudinal distance between the fixed point and the vehicle's sensor system may be determined as part of the same analysis during which the fixed point is detected within the sensor data captured by the vehicle's sensor system.

Likewise, the second longitudinal distance between the fixed point and the given reference point may be determined in various manners, including but not limited to the possibility that the second longitudinal distance between the fixed point and the given longitudinal reference point may be determined using available information regarding the physical dimensions of the vehicle. For example, to the extent that the fixed point is a laterally-centered point on the far edge of the vehicle's hood and the given longitudinal reference point is a point along the windshield, the second longitudinal distance between this fixed point and this given reference point may be determined using available information regarding the length of the vehicle's hood. Many other examples are possible as well.

Lastly, based on at least the first and second longitudinal distances, the longitudinal offset between the vehicle's sensor system and the desired reference point may be determined. For instance, if the given longitudinal reference point is closer to the fixed point than the vehicle's sensor system, then the longitudinal offset between the vehicle's sensor system and the given reference point may be determined by subtracting the second longitudinal distance between the fixed point and the given reference point from the first longitudinal distance between the fixed point and the vehicle's sensor system. On the other hand, if the given longitudinal reference point is farther from the fixed point than the vehicle's sensor system, then the longitudinal offset between the vehicle's sensor system and the given reference point may be determined by subtracting the first longitudinal distance between the fixed point and the vehicle's sensor system from the second longitudinal distance between the fixed point and the given reference point.

Individual longitudinal offsets that are determined in this manner may then be aggregated together (e.g., by calculating an unweighted or weighted average) to produce an aggregated longitudinal offset for the vehicle's sensor system.

Figure 4:
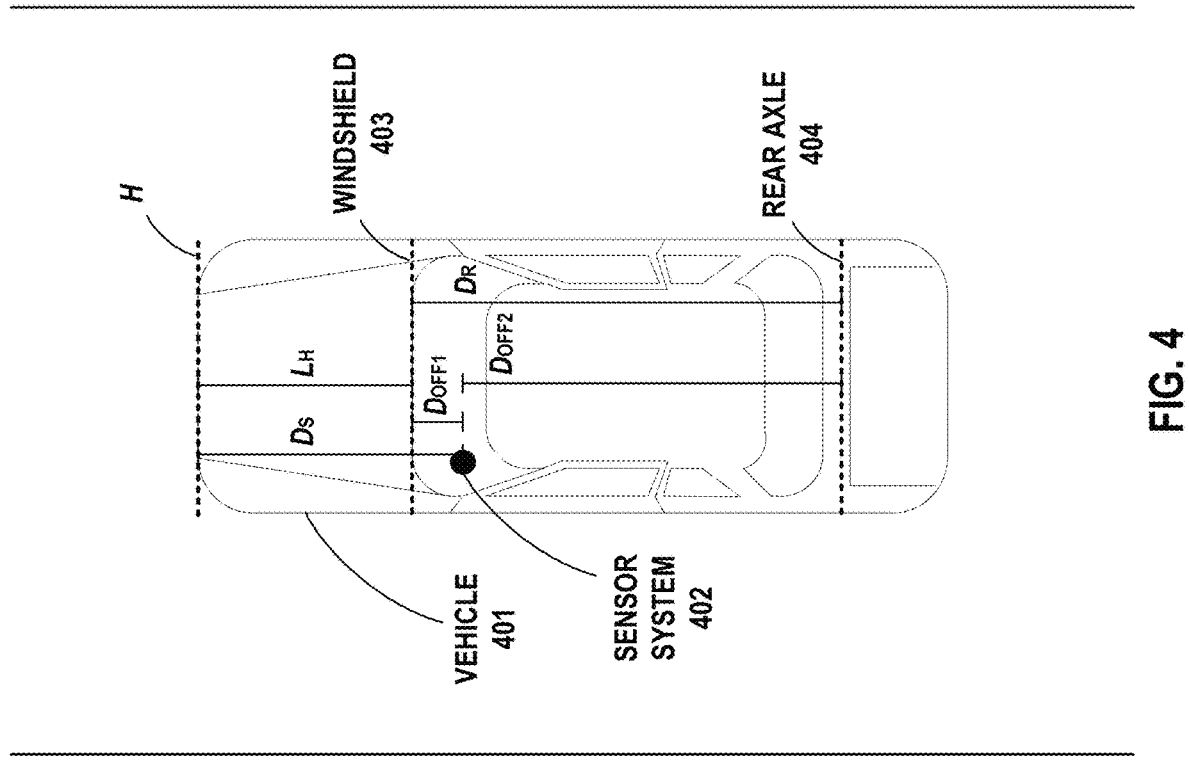
FIG. 4 is a diagram that illustrates a first example technique for determining a longitudinal offset between a vehicle's sensor system and a reference point of the vehicle in accordance with the present disclosure.

One possible example of this disclosed technique for determining a longitudinal position of a vehicle's sensor system relative to a longitudinal reference point within the vehicle itself is illustrated in FIG. 4. As shown in FIG. 4, a vehicle 401 has an associated sensor system 402, which may be affixed at some unknown longitudinal position along the dashboard of vehicle 401, and it may be desirable to determine the longitudinal offset of sensor system 402 relative to a windshield 403 of vehicle 401 so that this longitudinal offset can be used during the course of deriving a trajectory for vehicle 401 (among other possible uses for this longitudinal offset).

In this example, an analysis of sensor data captured by sensor system 402 (e.g., image data) may be performed in order to detect a fixed point H on the front end of the hood of vehicle 401 and determine a longitudinal distance $D_s$ between fixed point H and sensor system 402. Additionally, a distance $L_H$ between fixed point H and windshield 403 may be determined using available information regarding the physical dimensions of vehicle 401 (e.g., a prior measurement of the length of the vehicle's hood. In turn, a longitudinal offset $D_{OFF1}$ between sensor system 402 and windshield 403 may be determined by subtracting the distance $L_H$ from the distance $D_s$ between fixed point H and sensor system 402. This longitudinal offset $D_{OFF1}$ could then be aggregated together with other longitudinal offsets determined in a similar manner. In turn, the aggregated longitudinal offsets may be used during the course of deriving a trajectory of vehicle 401 from the sensor data captured by sensor system 402 in order to represent the real-world motion and location of vehicle 401 in terms of the longitudinal position of windshield 403 rather than sensor system 402, which may be a desirable longitudinal reference point to use for purposes of defining trajectories of vehicles.

In some cases, it may additionally or alternatively be desirable to determine the longitudinal position of sensor system 402 relative to another longitudinal reference point of vehicle 401 that differs from windshield 403, such as a rear axle of vehicle 401. In this respect, the lateral offset between sensor system 402 and this other longitudinal reference point may be determined by (i) using available information regarding the vehicle's physical dimensions to determine a longitudinal distance between windshield 403 and the other longitudinal reference point of vehicle 401 and then (ii) subtracting the first longitudinal offset $D_{OFF1}$ between sensor system 402 and windshield 403 from the determined longitudinal distance between windshield 403 and the other longitudinal reference point of vehicle 401.

For instance, as shown in FIG. 4, available information regarding the vehicle's physical dimensions may be used to determine a distance DR between windshield 403 and rear axle 404, and the first longitudinal offset $D_{OFF1}$ may then be subtracted from the distance DR to determine a second longitudinal offset $D_{OFF2}$ between sensor system 402 and rear axle 404. Similar to the first longitudinal offset $D_{OFF1}$, this second longitudinal offset $D_{OFF2}$ could then be aggregated together with other longitudinal offsets determined in a similar manner, and the resulting aggregated longitudinal offset may in turn be used during the course of deriving a trajectory of vehicle 401 from the sensor data captured by sensor system 402 in order to represent the real-world motion and location of vehicle 401 in terms of the longitudinal position of rear axle 404 rather than sensor system 402, which may be a desirable longitudinal reference point to use for purposes of defining trajectories of vehicles.

The foregoing implementation of the disclosed technique may be applicable in situations where (i) there is a fixed point on the vehicle that is perceivable by the vehicle's sensor system and (ii) there is available information regarding the longitudinal positioning of that fixed point relative to at least one longitudinal reference point within the vehicle. However, in some situations, there may be no such fixed point that can be used. In such situations, a second implementation of the disclosed technique may leverage information about the vehicle's surrounding environment together with an inference about typical driving behavior in order to determine a longitudinal position of a vehicle's sensor system relative to the vehicle itself.

This second implementation of the disclosed technique may begin with a detection that the vehicle is facing a scenario for which an inference can be made about a longitudinal distance between a fixed point of the vehicle and a detected object in the vehicle's surrounding environment. For example, the scenario detected may be that the vehicle is stopped at a stop sign, and the inference may be that the front edge of the vehicle's hood will be stopped at a particular longitudinal distance (e.g., 5 feet) from the stop sign. Many other examples of scenarios and inferences may be possible as well.

Once such a detection is made, the longitudinal position of the vehicle's sensor system relative to a given longitudinal reference point of the vehicle may be determined by performing additional functions of (i) determining a first longitudinal distance between the vehicle's sensor system and the detected object in the vehicle's surrounding environment (e.g., based on an analysis of sensor data captured by the vehicle's sensor system), (ii) determining a second longitudinal distance between the fixed point of the vehicle and the given longitudinal reference point within the vehicle, and (iv) based on the inferred distance between the fixed point of the vehicle and the detected object in the vehicle's surrounding environment, the first longitudinal distance, and the second longitudinal distance, determining a respective measure of the longitudinal offset between the vehicle's sensor system and the given reference point.

The respective measures of the longitudinal offset that are determined in this manner may then be aggregated together (e.g., by calculating an unweighted or weighted average) to produce an aggregated longitudinal offset for the vehicle's sensor system.

Figure 5:
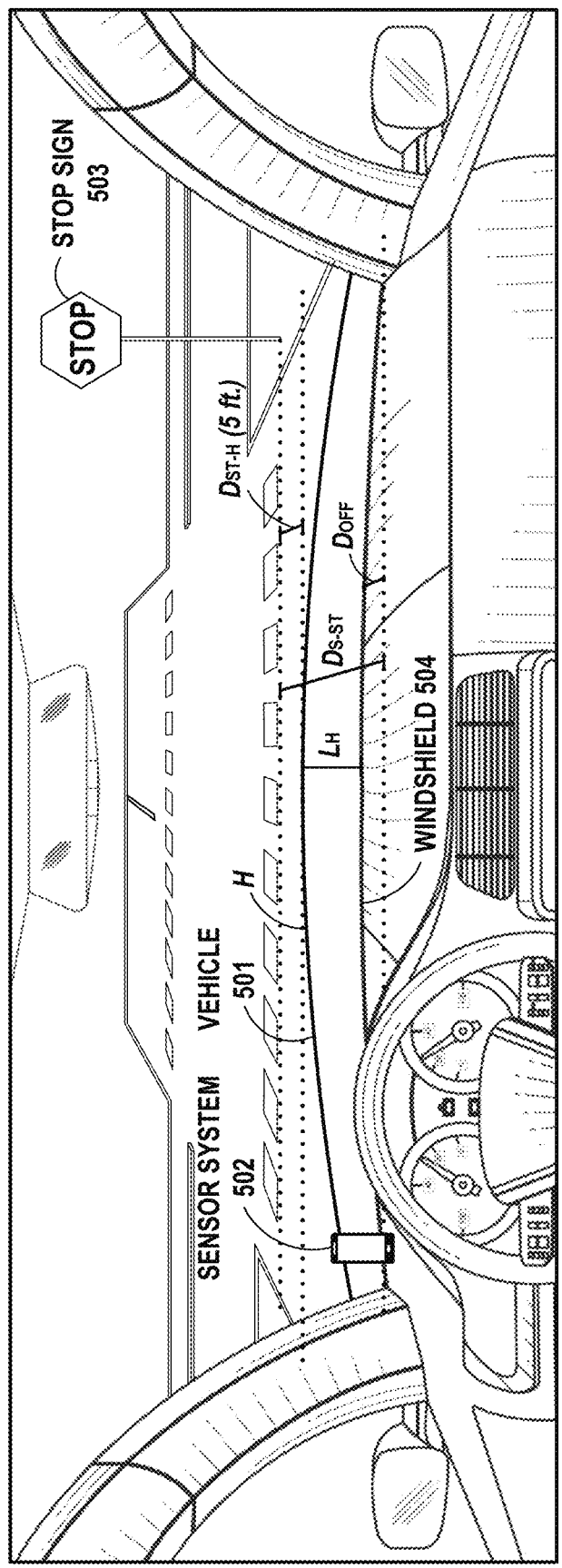
FIG. 5 is a diagram that illustrates a second example technique for determining a longitudinal offset between a vehicle's sensor system and a reference point of the vehicle in accordance with the present disclosure.

Another possible example of this disclosed technique for determining a longitudinal position of a vehicle's sensor system relative to a longitudinal reference point within the vehicle itself is illustrated in FIG. 5. As shown in FIG. 5, a vehicle 501 may have an associated sensor system 502, which may be affixed at some unknown longitudinal position along the dashboard of vehicle 501, and it may be desirable to determine the longitudinal offset of sensor system 502 relative to a windshield 504 of vehicle 501 so that this longitudinal offset can be used during the course of deriving a trajectory for vehicle 401 (among other possible uses for this longitudinal offset).

In this example, an analysis of the sensor data captured by sensor system 502 (e.g., telematics data and image data in combination) may be performed in order to detect that vehicle 501 is stopped at a stop sign 503, which gives rise to an inference that a fixed point H on the front end of the hood of vehicle 501 may be located at a particular longitudinal distance $D_{ST-H}$ from stop sign 503 (e.g., an inferred longitudinal distance of 5 feet).

Once this scenario is detected, two other longitudinal distances may be determined: (i) a first longitudinal distance $D_{S-ST}$ between sensor system 502 and stop sign 503, which may be determined based on an analysis of sensor data captured by sensor system 502, and (ii) a second longitudinal distance $L_H$ between fixed point H and windshield 504, which may be determined using available information regarding the physical dimensions of vehicle 501 (e.g., the length of the hood).

Based on inferred distance $D_{ST-H}$, first longitudinal distance $D_{S-ST}$, and second longitudinal distance $L_H$, a respective measure of the longitudinal offset $D_{OFF}$ between sensor system 502 and windshield 504 may be determined. For instance, this longitudinal offset $D_{OFF}$ between sensor system 502 and windshield 504 may be determined by subtracting both inferred distance $D_{ST-H}$ and second longitudinal distance $L_H$ from first longitudinal distance $D_{S-ST}$. This respective measure of the longitudinal offset $D_{OFF}$ could then be aggregated together with other longitudinal offsets determined in a similar manner. In turn, the aggregated longitudinal offsets may be used during course of deriving a trajectory of vehicle 501 from the sensor data captured by sensor system 502 in order to represent the real-world motion and location of vehicle 502 in terms of the longitudinal position of windshield 504 rather than sensor system 502, which may be a desirable longitudinal reference point to use for purposes of defining trajectories of vehicles.

In some cases, in addition to defining a trajectory of a vehicle in terms of a specific lateral and/or longitudinal reference point within the vehicle, it may also be desirable to define the trajectory of the vehicle in terms of a specific vertical reference point related to the vehicle as opposed to the vertical positioning of the sensor system. For example, there may be a desire to define the trajectory of the vehicle in terms of the vertical point where the vehicle converged with the ground plane, as vehicle trajectories defined in these terms could potentially be used to infer elevation information for map elements such as roads and lanes thereof. As another example, there may be a desire to define the trajectory of the vehicle in terms of another vertical reference point, such as the vertical center of the vehicle. In this respect, disclosed herein are additional techniques for determining elevation information for a vertical reference point related to a vehicle, which may also be used during the course of deriving the trajectory for the vehicle.

In accordance with the present disclosure, elevation information for the vertical point where the vehicle converged with the ground plane may be determined using any of various different techniques. For instance, according to one technique, a map encoded with ground elevation information may be used, to the extent available, in order to determine elevation information for the vertical point where the vehicle converged with the ground plane as it operated within the real-world environment. In this respect, the function of using a map encoded with the ground elevation information may involve (i) performing localization on the obtained sensor data captured by the vehicle's sensor system in order to determine the sensor system's location within the map at each of various times during the given period of time in the past, and then (ii) for each respective time in the past, determining the ground elevation encoded at the vehicle's determined location within the map.

According to another technique, elevation information for the vertical point where the vehicle converged with the ground plane as it operated within the real-world environment may be determined by performing the following functions for each of various different points in time during the given period of time in the past: (i) determining an elevation of the vehicle's sensor system at a respective point in time as indicated by the captured sensor data, (ii) analyzing the captured sensor data to determine the sensor system's vertical distance from the ground at the respective point in time (e.g., by performing object detection to detect the ground), and then (iii) subtracting this vertical distance from the determined elevation of the sensor system in order to determine an elevation of the point where the vehicle converged with the ground plane at the respective point in time.

According to yet another technique, elevation information for the vertical point where the vehicle converged with the ground plane as it operated within the real-world environment may be determined by estimating the sensor system's vertical distance above ground based on the type of sensor system and available information regarding the vehicle's physical dimensions (e.g., body structure measurements, make/model information, etc.), and then performing the following functions for each of various different points in time during the given period of time in the past: (i) determining an elevation of the vehicle's sensor system at a respective point in time as indicated by the captured sensor data, and (ii) subtracting the sensor system's estimated vertical distance above ground from the determined elevation of the sensor system in order to determine an elevation of the point where the vehicle converged with the ground plane at the respective point in time. In this respect, the function of estimating the sensor system's vertical distance above ground using available information regarding the vehicle's physical dimensions may take various forms.

In one example where the sensor system is a camera-based system, estimating the sensor system's vertical distance above ground may involve (i) inferring that the sensor system is mounted to the vehicle's dashboard and then (ii) using available information about the vehicle's physical dimensions to determine the vertical distance above ground of the vehicle's dashboard, which could include information regarding the vertical distance between the vehicle's dashboard and the vehicle's lower body as well as information regarding the vertical distance that the vehicle's lower body is raised off of the ground by the vehicle's tires.

In another example where the sensor system is a LiDAR unit, estimating the sensor system's vertical distance above ground may involve (i) inferring that the sensor system is positioned on the vehicle's roof and then (ii) using available information about the vehicle's physical dimensions to determine the vertical distance above ground of the vehicle's roof, which could include information regarding the vertical distance between the vehicle's roof and the vehicle's lower body as well as information regarding the vertical distance that the vehicle's lower body is raised off of the ground by the vehicle's tires.

The function of estimating the sensor system's vertical distance above ground using available information regarding the vehicle's physical dimensions may take other forms as well.

In accordance with the present disclosure, elevation information for another vertical reference point within the vehicle may be determined by using techniques similar to those described above in combination with available information regarding the physical dimensions of the vehicle. For instance, according to one technique, elevation information for a vertical reference point within a vehicle may be determined by (i) using map data encoded with ground elevation information to determine elevation information for the vertical point where the vehicle converged with the ground plane as it operated within the real-world environment, and then (ii) adding the vertical distance above ground of the vertical reference point, which may be determined based on available information regarding the physical dimensions of the vehicle, to each elevation value included in the elevation information for the vertical point where the vehicle converged with the ground plane.

According to another technique, elevation information for a vertical reference point within a vehicle may be determined by performing the following functions for each of various different points in time during the given period of time in the past: (i) determining an elevation of the vehicle's sensor system at a respective point in time as indicated by the captured sensor data, (ii) analyzing the captured sensor data to determine the sensor system's vertical distance from the ground at the respective point in time (e.g., by performing object detection to detect the ground), (iii) subtracting this vertical distance from the determined elevation of the sensor system in order to determine an elevation of the point where the vehicle converged with the ground plane at the respective point in time, and then (iv) adding the vertical distance above ground of the vertical reference point, which may be determined based on available information regarding the physical dimensions of the vehicle, to the elevation of the point where the vehicle converged with the ground plane at the respective point in time.

According to yet another technique, elevation information for a vertical reference point within a vehicle may be determined by first estimating the sensor system's vertical distance above ground based on the type of sensor system and available information regarding the vehicle's physical dimensions (e.g., body structure measurements, make/model information, etc.), and then performing the following functions for each of various different points in time during the given period of time in the past: (i) determining an elevation of the vehicle's sensor system at a respective point in time as indicated by the captured sensor data, (ii) subtracting the sensor system's estimated vertical distance above ground from the determined elevation of the sensor system in order to determine an elevation of the point where the vehicle converged with the ground plane at the respective point in time, and then (iii) adding the vertical distance above ground of the vertical reference point, which may be determined based on available information regarding the physical dimensions of the vehicle, to the elevation of the point where the vehicle converged with the ground plane at the respective point in time. In this respect, the function of estimating the sensor system's vertical distance above ground using available information regarding the vehicle's physical dimensions may take various forms, including but not limited to the forms discussed above.

In accordance with the present disclosure, elevation information for a vertical reference point related to a vehicle may be determined in other manners as well.

After the elevation information for a vertical reference point related to a vehicle is determined, that elevation information may then be encoded into a trajectory for the vehicle that is derived in the manner described above (among other possible uses for this elevation information).

Figure 6:
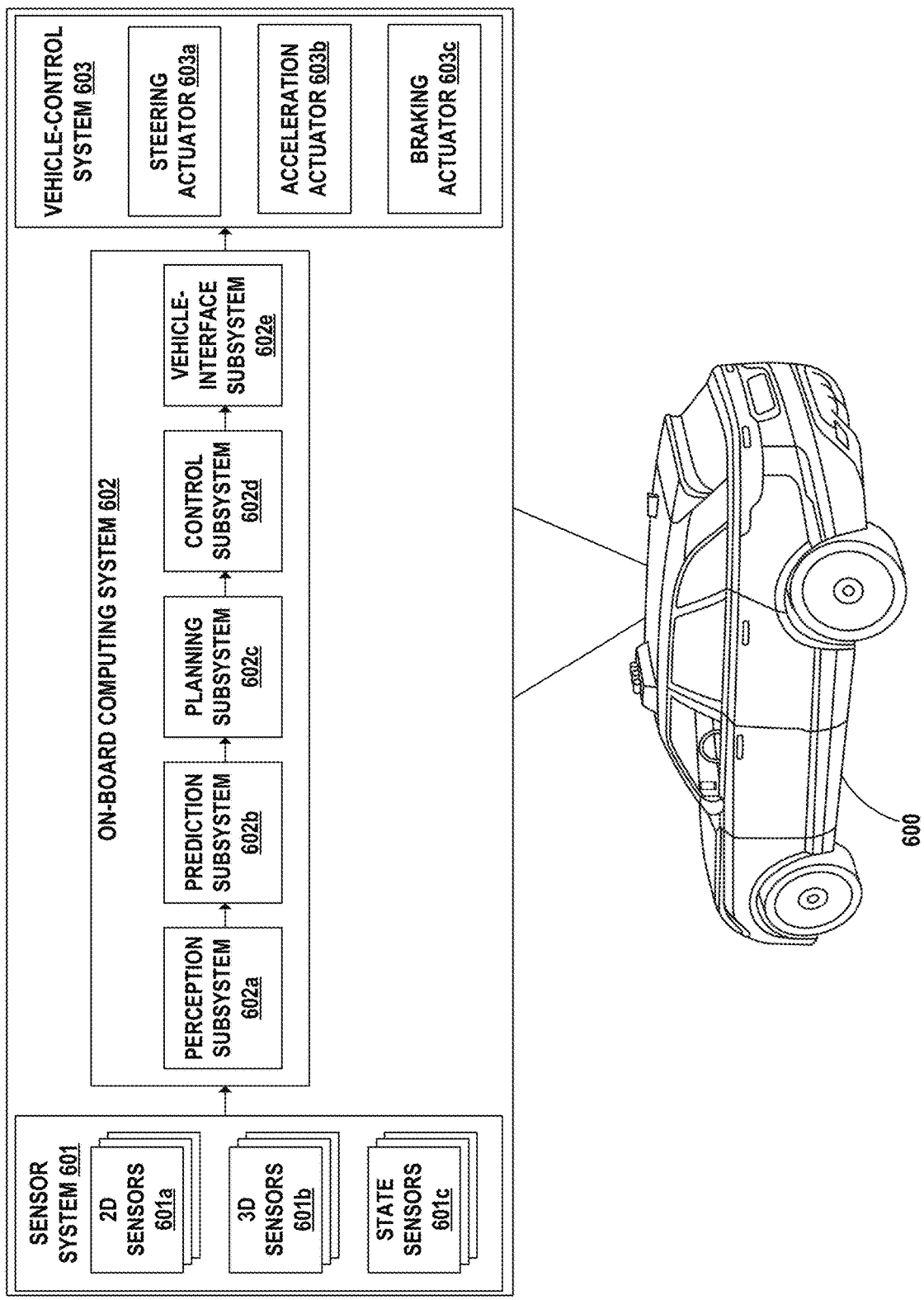
FIG. 6 is a simplified block diagram that illustrates certain systems that may be included in an example vehicle.

In line with the discussion above, one possible use case for the trajectories derived using the disclosed techniques is for purposes of informing operations that are performed by an on-board computing system of a vehicle. Turning now to FIG. 6, a simplified block diagram is provided to illustrate certain systems that may be included in one possible example of a vehicle 600 that may make use of prior trajectories. As shown, at a high level, vehicle 600 may include at least (i) a sensor system 601 that is configured to capture sensor data that is representative of the real-world environment being perceived by the vehicle (i.e., the vehicle's "surrounding environment") and/or the vehicle's operation within that real-world environment, (ii) an on-board computing system 602 that is configured to perform functions related to autonomous operation of vehicle 600 (and perhaps other functions as well), and (iii) a vehicle-control system 603 that is configured to control the physical operation of vehicle 600, among other possibilities. Each of these systems may take various forms.

In general, sensor system 601 may comprise any of various different types of sensors, each of which is generally configured to detect one or more particular stimuli based on vehicle 600 operating in a real-world environment. The sensors then output sensor data that is indicative of one or more measured values of the one or more stimuli at one or more capture times (which may each comprise a single instant of time or a range of times).

For instance, as one possibility, sensor system 601 may include one or more 2D sensors 601a that are each configured to capture 2D sensor data that is representative of the vehicle's surrounding environment. Examples of 2D sensor(s) 601a may include a single 2D camera, a 2D camera array, a 2D RADAR unit, a 2D SONAR unit, a 2D ultrasound unit, a 2D scanner, and/or 2D sensors equipped with visible-light and/or infrared sensing capabilities, among other possibilities. Further, in an example implementation, 2D sensor(s) 601a may have an arrangement that is capable of capturing 2D sensor data representing a 350° view of the vehicle's surrounding environment, one example of which may take the form of an array of 6-7 cameras that each have a different capture angle. Other 2D sensor systems are also possible.

As another possibility, sensor system 601 may include one or more 3D sensors 601b that are each configured to capture 3D sensor data that is representative of the vehicle's surrounding environment. Examples of 3D sensor(s) 601b may include a LiDAR unit, a 3D RADAR unit, a 3D SONAR unit, a 3D ultrasound unit, and a camera array equipped for stereo vision, among other possibilities. Further, in an example implementation, 3D sensor(s) 601b may comprise an arrangement that is capable of capturing 3D sensor data representing a 350° view of the vehicle's surrounding environment, one example of which may take the form of a LiDAR unit that is configured to rotate 350° around its installation axis. Other 3D sensor systems are also possible.

As yet another possibility, sensor system 601 may include one or more state sensors 601c that are each configured capture sensor data that is indicative of aspects of the vehicle's current state, such as the vehicle's current position, current orientation (e.g., heading/yaw, pitch, and/or roll), current velocity, and/or current acceleration of vehicle 600. Examples of state sensor(s) 601c may include an IMU (which may be comprised of accelerometers, gyroscopes, and/or magnetometers), an Inertial Navigation System (INS), a Global Navigation Satellite System (GNSS) unit such as a GPS unit, among other possibilities.

Sensor system 601 may include various other types of sensors as well.

In turn, on-board computing system 602 may generally comprise any computing system that includes at least a communication interface, a processor, and data storage, where such components may either be part of a single physical computing device or be distributed across a plurality of physical computing devices that are interconnected together via a communication link. Each of these components may take various forms.

For instance, the communication interface of on-board computing system 602 may take the form of any one or more interfaces that facilitate communication with other systems of vehicle 600 (e.g., sensor system 601, vehicle-control system 603, etc.) and/or remote computing systems (e.g., a transportation-matching system), among other possibilities. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols.

Further, the processor of on-board computing system 602 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities.

Further yet, the data storage of on-board computing system 602 may comprise one or more non-transitory computer-readable mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the processor of on-board computing system 602 such that on-board computing system 602 is configured to perform various functions related to the autonomous operation of vehicle 600 (among other possible functions), and (ii) data that may be obtained, derived, or otherwise stored by on-board computing system 602.

In one embodiment, on-board computing system 602 may also be functionally configured into a number of different subsystems that are each tasked with performing a specific subset of functions that facilitate the autonomous operation of vehicle 600, and these subsystems may be collectively referred to as the vehicle's "autonomy system." In practice, each of these subsystems may be implemented in the form of program instructions that are stored in the on-board computing system's data storage and are executable by the on-board computing system's processor to carry out the subsystem's specific subset of functions, although other implementations are possible as well—including the possibility that different subsystems could be implemented via different hardware components of on-board computing system 602.

As shown in FIG. 5, in one embodiment, the functional subsystems of on-board computing system 602 may include (i) a perception subsystem 602a that generally functions to derive a representation of the surrounding environment being perceived by vehicle 600, (ii) a prediction subsystem 602b that generally functions to predict the future state of each object detected in the vehicle's surrounding environment, (iii) a planning subsystem 602c that generally functions to derive a behavior plan for vehicle 600, (iv) a control subsystem 602d that generally functions to transform the behavior plan for vehicle 600 into control signals for causing vehicle 600 to execute the behavior plan, and (v) a vehicle-interface subsystem 602e that generally functions to translate the control signals into a format that vehicle-control system 603 can interpret and execute. However, it should be understood that the functional subsystems of on-board computing system 602 may take various other forms as well. Each of these example subsystems will now be described in further detail below.

For instance, the subsystems of on-board computing system 602 may begin with perception subsystem 602a, which may be configured to fuse together various different types of "raw" data that relate to the vehicle's perception of its surrounding environment and thereby derive a representation of the surrounding environment being perceived by vehicle 600. In this respect, the "raw" data that is used by perception subsystem 602a to derive the representation of the vehicle's surrounding environment may take any of various forms.

For instance, at a minimum, the "raw" data that is used by perception subsystem 602a may include multiple different types of sensor data captured by sensor system 601, such as 2D sensor data (e.g., image data) that provides a 2D representation of the vehicle's surrounding environment, 3D sensor data (e.g., LIDAR data) that provides a 3D representation of the vehicle's surrounding environment, and/or state data for vehicle 600 that indicates the past and current position, orientation, velocity, and acceleration of vehicle 600. Additionally, the "raw" data that is used by perception subsystem 602a may include map data associated with the vehicle's location, such as high-definition geometric and/or semantic map data, which may be preloaded onto on-board computing system 602 and/or obtained from a remote computing system. Additionally yet, the "raw" data that is used by perception subsystem 602a may include navigation data for vehicle 600 that indicates a specified origin and/or specified destination for vehicle 600, which may be obtained from a remote computing system (e.g., a transportation-matching system) and/or input by a human riding in vehicle 600 via a user-interface component that is communicatively coupled to on-board computing system 602. Additionally still, the "raw" data that is used by perception subsystem 602a may include other types of data that may provide context for the vehicle's perception of its surrounding environment, such as weather data and/or traffic data, which may be obtained from a remote computing system. The "raw" data that is used by perception subsystem 602a may include other types of data as well.

Advantageously, by fusing together multiple different types of raw data (e.g., both 2D sensor data and 3D sensor data), perception subsystem 602a is able to leverage the relative strengths of these different types of raw data in a way that may produce a more accurate and precise representation of the surrounding environment being perceived by vehicle 600.

Further, the function of deriving the representation of the surrounding environment perceived by vehicle 600 using the raw data may include various aspects. For instance, one aspect of deriving the representation of the surrounding environment perceived by vehicle 600 using the raw data may involve determining a current state of vehicle 600 itself, such as a current position, a current orientation, a current velocity, and/or a current acceleration, among other possibilities. In this respect, perception subsystem 602a may also employ a localization technique such as SLAM to assist in the determination of the vehicle's current position and/or orientation. (Alternatively, it is possible that on-board computing system 602 may run a separate localization service that determines position and/or orientation values for vehicle 600 based on raw data, in which case these position and/or orientation values may serve as another input to perception subsystem 602a).

Another aspect of deriving the representation of the surrounding environment perceived by vehicle 600 using the raw data may involve detecting objects within the vehicle's surrounding environment, which may result in the determination of class labels, bounding boxes, or the like for each detected object. In this respect, the particular classes of objects that are detected by perception subsystem 602a (which may be referred to as "agents") may take various forms, including both (i) "dynamic" objects that have the potential to move, such as vehicles, cyclists, pedestrians, and animals, among other examples, and (ii) "static" objects that generally do not have the potential to move, such as streets, curbs, lane markings, traffic lights, stop signs, and buildings, among other examples. Further, in practice, perception subsystem 602a may be configured to detect objects within the vehicle's surrounding environment using any type of object detection model now known or later developed, including but not limited object detection models based on convolutional neural networks (CNN).

Yet another aspect of deriving the representation of the surrounding environment perceived by vehicle 600 using the raw data may involve determining a current state of each object detected in the vehicle's surrounding environment, such as a current position (which could be reflected in terms of coordinates and/or in terms of a distance and direction from vehicle 600), a current orientation, a current velocity, and/or a current acceleration of each detected object, among other possibilities. In this respect, the current state of each detected object may be determined either in terms of an absolute measurement system or in terms of a relative measurement system that is defined relative to a state of vehicle 600, among other possibilities.

The function of deriving the representation of the surrounding environment perceived by vehicle 600 using the raw data may include other aspects as well.

Further yet, the derived representation of the surrounding environment perceived by vehicle 600 may incorporate various different information about the surrounding environment perceived by vehicle 600, examples of which may include (i) a respective set of information for each object detected in the vehicle's surrounding, such as a class label, a bounding box, and/or state information for each detected object, (ii) a set of information for vehicle 600 itself, such as state information and/or navigation information (e.g., a specified destination), and/or (iii) other semantic information about the surrounding environment (e.g., time of day, weather conditions, traffic conditions, etc.). The derived representation of the surrounding environment perceived by vehicle 600 may incorporate other types of information about the surrounding environment perceived by vehicle 600 as well.

Still further, the derived representation of the surrounding environment perceived by vehicle 600 may be embodied in various forms. For instance, as one possibility, the derived representation of the surrounding environment perceived by vehicle 600 may be embodied in the form of a data structure that represents the surrounding environment perceived by vehicle 600, which may comprise respective data arrays (e.g., vectors) that contain information about the objects detected in the surrounding environment perceived by vehicle 600, a data array that contains information about vehicle 600, and/or one or more data arrays that contain other semantic information about the surrounding environment. Such a data structure may be referred to as a "parameter-based encoding."

As another possibility, the derived representation of the surrounding environment perceived by vehicle 600 may be embodied in the form of a rasterized image that represents the surrounding environment perceived by vehicle 600 in the form of colored pixels. In this respect, the rasterized image may represent the surrounding environment perceived by vehicle 600 from various different visual perspectives, examples of which may include a "top down" view and a "bird's eye" view of the surrounding environment, among other possibilities. Further, in the rasterized image, the objects detected in the surrounding environment of vehicle 600 (and perhaps vehicle 600 itself) could be shown as color-coded bitmasks and/or bounding boxes, among other possibilities.

The derived representation of the surrounding environment perceived by vehicle 600 may be embodied in other forms as well.

As shown, perception subsystem 602a may pass its derived representation of the vehicle's surrounding environment to prediction subsystem 602b. In turn, prediction subsystem 602b may be configured to use the derived representation of the vehicle's surrounding environment (and perhaps other data) to predict a future state of each object detected in the vehicle's surrounding environment at one or more future times (e.g., at each second over the next 5 seconds)—which may enable vehicle 600 to anticipate how the real-world objects in its surrounding environment are likely to behave in the future and then plan its behavior in a way that accounts for this future behavior.

Prediction subsystem 602b may be configured to predict various aspects of a detected object's future state, examples of which may include a predicted future position of the detected object, a predicted future orientation of the detected object, a predicted future velocity of the detected object, and/or predicted future acceleration of the detected object, among other possibilities. In this respect, if prediction subsystem 602b is configured to predict this type of future state information for a detected object at multiple future times, such a time sequence of future states may collectively define a predicted future trajectory of the detected object. Further, in some embodiments, prediction subsystem 602b could be configured to predict multiple different possibilities of future states for a detected object (e.g., by predicting the 3 most-likely future trajectories of the detected object). Prediction subsystem 602b may be configured to predict other aspects of a detected object's future behavior as well.

In practice, prediction subsystem 602b may predict a future state of an object detected in the vehicle's surrounding environment in various manners, which may depend in part on the type of detected object. For instance, as one possibility, prediction subsystem 602b may predict the future state of a detected object using a data science model that is configured to (i) receive input data that includes one or more derived representations output by perception subsystem 602a at one or more perception times (e.g., the "current" perception time and perhaps also one or more prior perception times), (ii) based on an evaluation of the input data, which includes state information for the objects detected in the vehicle's surrounding environment at the one or more perception times, predict at least one likely time sequence of future states of the detected object (e.g., at least one likely future trajectory of the detected object), and (iii) output an indicator of the at least one likely time sequence of future states of the detected object. This type of data science model may be referred to herein as a "future-state model."

Such a future-state model will typically be created by an off-board computing system (e.g., a backend platform) and then loaded onto on-board computing system 602, although it is possible that a future-state model could be created by on-board computing system 602 itself. Either way, the future-state model may be created using any modeling technique now known or later developed, including but not limited to a machine-learning technique that may be used to iteratively "train" the data science model to predict a likely time sequence of future states of an object based on training data. The training data may comprise both test data (e.g., historical representations of surrounding environments at certain historical perception times) and associated ground-truth data (e.g., historical state data that indicates the actual states of objects in the surrounding environments during some window of time following the historical perception times).

Prediction subsystem 602b could predict the future state of a detected object in other manners as well. For instance, for detected objects that have been classified by perception subsystem 602a as belonging to certain classes of static objects (e.g., roads, curbs, lane markings, etc.), which generally do not have the potential to move, prediction subsystem 602b may rely on this classification as a basis for predicting that the future state of the detected object will remain the same at each of the one or more future times (in which case the state-prediction model may not be used for such detected objects). However, it should be understood that detected objects may be classified by perception subsystem 602a as belonging to other classes of static objects that have the potential to change state despite not having the potential to move, in which case prediction subsystem 602b may still use a future-state model to predict the future state of such detected objects. One example of a static object class that falls within this category is a traffic light, which generally does not have the potential to move but may nevertheless have the potential to change states (e.g. between green, yellow, and red) while being perceived by vehicle 600.

After predicting the future state of each object detected in the surrounding environment perceived by vehicle 600 at one or more future times, prediction subsystem 602b may then either incorporate this predicted state information into the previously-derived representation of the vehicle's surrounding environment (e.g., by adding data arrays to the data structure that represents the surrounding environment) or derive a separate representation of the vehicle's surrounding environment that incorporates the predicted state information for the detected objects, among other possibilities.

As shown, prediction subsystem 602b may pass the one or more derived representations of the vehicle's surrounding environment to planning subsystem 602c. In turn, planning subsystem 602c may be configured to use the one or more derived representations of the vehicle's surrounding environment (and perhaps other data) to derive a behavior plan for vehicle 600, which defines the desired driving behavior of vehicle 600 for some future period of time (e.g., the next 5 seconds).

The behavior plan that is derived for vehicle 600 may take various forms. For instance, as one possibility, the derived behavior plan for vehicle 600 may comprise a planned trajectory for vehicle 600 that specifies a planned state of vehicle 600 at each of one or more future times (e.g., each second over the next 5 seconds), where the planned state for each future time may include a planned position of vehicle 600 at the future time, a planned orientation of vehicle 600 at the future time, a planned velocity of vehicle 600 at the future time, and/or a planned acceleration of vehicle 600 (whether positive or negative) at the future time, among other possible types of state information. As another possibility, the derived behavior plan for vehicle 600 may comprise one or more planned actions that are to be performed by vehicle 600 during the future window of time, where each planned action is defined in terms of the type of action to be performed by vehicle 600 and a time and/or location at which vehicle 600 is to perform the action, among other possibilities. The derived behavior plan for vehicle 600 may define other planned aspects of the vehicle's behavior as well.

Further, in practice, planning subsystem 602c may derive the behavior plan for vehicle 600 in various manners. For instance, as one possibility, planning subsystem 602c may be configured to derive the behavior plan for vehicle 600 by (i) deriving a plurality of different "candidate" behavior plans for vehicle 600 based on the one or more derived representations of the vehicle's surrounding environment (and perhaps other data), (ii) evaluating the candidate behavior plans relative to one another (e.g., by scoring the candidate behavior plans using one or more cost functions)

in order to identify which candidate behavior plan is most desirable when considering factors such as proximity to other objects, velocity, acceleration, time and/or distance to destination, road conditions, weather conditions, traffic conditions, and/or traffic laws, among other possibilities, and then (iii) selecting the candidate behavior plan identified as being most desirable as the behavior plan to use for vehicle 600. Planning subsystem 602c may derive the behavior plan for vehicle 600 in various other manners as well.

After deriving the behavior plan for vehicle 600, planning subsystem 602c may pass data indicating the derived behavior plan to control subsystem 602d. In turn, control subsystem 602d may be configured to transform the behavior plan for vehicle 600 into one or more control signals (e.g., a set of one or more command messages) for causing vehicle 600 to execute the behavior plan. For instance, based on the behavior plan for vehicle 600, control subsystem 602d may be configured to generate control signals for causing vehicle 600 to adjust its steering in a specified manner, accelerate in a specified manner, and/or brake in a specified manner, among other possibilities.

As shown, control subsystem 602d may then pass the one or more control signals for causing vehicle 600 to execute the behavior plan to vehicle-interface subsystem 602e. In turn, vehicle-interface subsystem 602e may be configured to translate the one or more control signals into a format that can be interpreted and executed by components of vehicle-control system 603. For example, vehicle-interface subsystem 602e may be configured to translate the one or more control signals into one or more control messages are defined according to a particular format or standard, such as a CAN bus standard and/or some other format or standard that is used by components of vehicle-control system 603.

In turn, vehicle-interface subsystem 602e may be configured to direct the one or more control signals to the appropriate control components of vehicle-control system 603. For instance, as shown, vehicle-control system 603 may include a plurality of actuators that are each configured to control a respective aspect of the vehicle's physical operation, such as a steering actuator 603a that is configured to control the vehicle components responsible for steering (not shown), an acceleration actuator 603b that is configured to control the vehicle components responsible for acceleration such as a throttle (not shown), and a braking actuator 603c that is configured to control the vehicle components responsible for braking (not shown), among other possibilities. In such an arrangement, vehicle-interface subsystem 602e of on-board computing system 602 may be configured to direct steering-related control signals to steering actuator 603a, acceleration-related control signals to acceleration actuator 603b, and braking-related control signals to braking actuator 603c. However, it should be understood that the control components of vehicle-control system 603 may take various other forms as well.

Notably, the subsystems of on-board computing system 602 may be configured to perform the above functions in a repeated manner, such as many times per second, which may enable vehicle 600 to continually update both its understanding of the surrounding environment and its planned behavior within that surrounding environment.

Although not specifically shown, it should be understood that vehicle 600 includes various other systems and components as well, including but not limited to a propulsion system that is responsible for creating the force that leads to the physical movement of vehicle 600.

Figure 7:
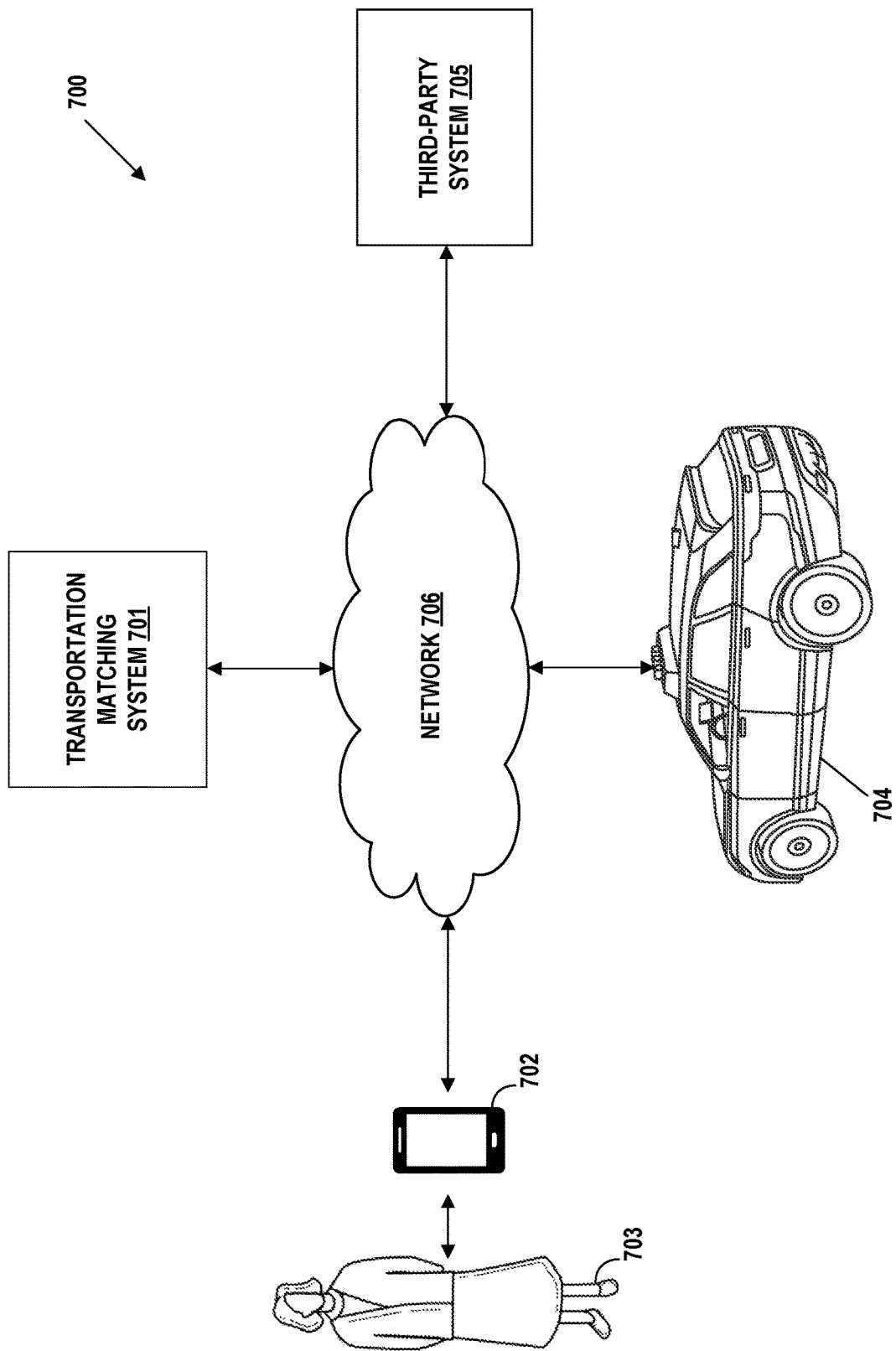
FIG. 7 a simplified block diagram that illustrates one example of a transportation-matching platform.

In line with the discussion above, another possible use case for the trajectories derived using the disclosed techniques is for purposes of informing operations that are performed by a transportation-matching platform. Turning now to FIG. 7, a simplified block diagram is provided to illustrate one possible example of a transportation-matching platform 700 that functions to match individuals interested in obtaining transportation from one location to another with transportation options, such as vehicles that are capable of providing the requested transportation. As shown, transportation-matching platform 700 may include at its core a transportation-matching system 701, which may be communicatively coupled via a communication network 706 to (i) a plurality of client stations of individuals interested in transportation (i.e., "transportation requestors"), of which client station 702 of transportation requestor 703 is shown as one representative example, (ii) a plurality of vehicles that are capable of providing the requested transportation, of which vehicle 704 is shown as one representative example, and (iii) a plurality of third-party systems that are capable of providing respective subservices that facilitate the platform's transportation matching, of which third-party system 705 is shown as one representative example.

Broadly speaking, transportation-matching system 701 may include one or more computing systems that collectively comprise a communication interface, at least one processor, data storage, and executable program instructions for carrying out functions related to managing and facilitating transportation matching. These one or more computing systems may take various forms and be arranged in various manners. For instance, as one possibility, transportation-matching system 701 may comprise computing infrastructure of a public, private, and/or hybrid cloud (e.g., computing and/or storage clusters). In this respect, the entity that owns and operates transportation-matching system 701 may either supply its own cloud infrastructure or may obtain the cloud infrastructure from a third-party provider of "on demand" computing resources, such as Amazon Web Services (AWS), Microsoft Azure, Google Cloud, Alibaba Cloud, or the like. As another possibility, transportation-matching system 701 may comprise one or more dedicated servers. Other implementations of transportation-matching system 701 are possible as well.

As noted, transportation-matching system 701 may be configured to perform functions related to managing and facilitating transportation matching, which may take various forms. For instance, as one possibility, transportation-matching system 701 may be configured to receive transportation requests from client stations of transportation requestors (e.g., client station 702 of transportation requestor 703) and then fulfill such transportation requests by dispatching suitable vehicles, which may include vehicle 704. In this respect, a transportation request from client station 702 of transportation requestor 703 may include various types of information.

For example, a transportation request from client station 702 of transportation requestor 703 may include specified pick-up and drop-off locations for the transportation. As another example, a transportation request from client station 702 of transportation requestor 703 may include an identifier that identifies transportation requestor 703 in transportation-matching system 701, which may be used by transportation-matching system 701 to access information about transportation requestor 703 (e.g., profile information) that is stored in one or more data stores of transportation-matching system 701 (e.g., a relational database system), in accordance with the transportation requestor's privacy settings. This transportation requestor information may take various forms, examples of which include profile information about transportation requestor 703. As yet another example, a transportation request from client station 702 of transportation requestor 703 may include preferences information for transportation requestor 703, examples of which may include vehicle-operation preferences (e.g., safety comfort level, preferred speed, rates of acceleration or deceleration, safety distance from other vehicles when traveling at various speeds, route, etc.), entertainment preferences (e.g., preferred music genre or playlist, audio volume, display brightness, etc.), temperature preferences, and/or any other suitable information.

As another possibility, transportation-matching system 701 may be configured to access information related to a requested transportation, examples of which may include information about locations related to the transportation, traffic data, route options, optimal pick-up or drop-off locations for the transportation, and/or any other suitable information associated with requested transportation. As an example and not by way of limitation, when transportation-matching system 701 receives a request for transportation from San Francisco International Airport (SFO) to Palo Alto, California, system 701 may access or generate any relevant information for this particular transportation request, which may include preferred pick-up locations at SFO, alternate pick-up locations in the event that a pick-up location is incompatible with the transportation requestor (e.g., the transportation requestor may be disabled and cannot access the pick-up location) or the pick-up location is otherwise unavailable due to construction, traffic congestion, changes in pick-up/drop-off rules, or any other reason, one or more routes to travel from SFO to Palo Alto, preferred off-ramps for a type of transportation requestor, and/or any other suitable information associated with the transportation.

In some embodiments, portions of the accessed information could also be based on historical data associated with historical transportation facilitated by transportation-matching system 701. For example, historical data may include aggregate information generated based on past transportation information, which may include any information described herein and/or other data collected by sensors affixed to or otherwise located within vehicles (including sensors of other computing devices that are located in the vehicles such as client stations). Such historical data may be associated with a particular transportation requestor (e.g., the particular transportation requestor's preferences, common routes, etc.), a category/class of transportation requestors (e.g., based on demographics), and/or all transportation requestors of transportation-matching system 701.

For example, historical data specific to a single transportation requestor may include information about past rides that a particular transportation requestor has taken, including the locations at which the transportation requestor is picked up and dropped off, music the transportation requestor likes to listen to, traffic information associated with the rides, time of day the transportation requestor most often rides, and any other suitable information specific to the transportation requestor. As another example, historical data associated with a category/class of transportation requestors may include common or popular ride preferences of transportation requestors in that category/class, such as teenagers preferring pop music, transportation requestors who frequently commute to the financial district may prefer to listen to the news, etc. As yet another example, historical data associated with all transportation requestors may include general usage trends, such as traffic and ride patterns.

Using such historical data, transportation-matching system 701 could be configured to predict and provide transportation suggestions in response to a transportation request. For instance, transportation-matching system 701 may be configured to apply one or more machine-learning techniques to such historical data in order to "train" a machine-learning model to predict transportation suggestions for a transportation request. In this respect, the one or more machine-learning techniques used to train such a machine-learning model may take any of various forms, examples of which may include a regression technique, a neural-network technique, a k-Nearest Neighbor (kNN) technique, a decision-tree technique, a support-vector-machines (SVM) technique, a Bayesian technique, an ensemble technique, a clustering technique, an association-rule-learning technique, and/or a dimensionality-reduction technique, among other possibilities.

In operation, transportation-matching system 701 may only be capable of storing and later accessing historical data for a given transportation requestor if the given transportation requestor previously decided to "opt-in" to having such information stored. In this respect, transportation-matching system 701 may maintain respective privacy settings for each transportation requestor that uses transportation-matching platform 700 and operate in accordance with these settings. For instance, if a given transportation requestor did not opt-in to having his or her information stored, then transportation-matching system 701 may forgo performing any of the above-mentioned functions based on historical data. Other possibilities also exist.

Transportation-matching system 701 may be configured to perform various other functions related to managing and facilitating transportation matching as well.

Referring again to FIG. 7, client station 702 of transportation requestor 703 may generally comprise any computing device that is configured to facilitate interaction between transportation requestor 703 and transportation-matching system 701. For instance, client station 702 may take the form of a smartphone, a tablet, a desktop computer, a laptop, a netbook, and/or a PDA, among other possibilities. Each such device may comprise an I/O interface, a communication interface, a GNSS unit such as a GPS unit, at least one processor, data storage, and executable program instructions for facilitating interaction between transportation requestor 703 and transportation-matching system 701 (which may be embodied in the form of a software application, such as a mobile application, web application, or the like). In this respect, the interaction that may take place between transportation requestor 703 and transportation-matching system 701 may take various forms, representative examples of which may include requests by transportation requestor 703 for new transportation events, confirmations by transportation-matching system 701 that transportation requestor 703 has been matched with a vehicle (e.g., vehicle 704), and updates by transportation-matching system 701 regarding the progress of the transportation event, among other possibilities.

In turn, vehicle 704 may generally comprise any kind of vehicle that can provide transportation, and in one example, may take the form of vehicle 600 described above. Further, the functionality carried out by vehicle 704 as part of transportation-matching platform 700 may take various forms, representative examples of which may include receiving a request from transportation-matching system 701 to handle a new transportation event, driving to a specified pickup location for a transportation event, driving from a specified pickup location to a specified drop-off location for a transportation event, and providing updates regarding the progress of a transportation event to transportation-matching system 701, among other possibilities.

Generally speaking, third-party system 705 may include one or more computing systems that collectively comprise a communication interface, at least one processor, data storage, and executable program instructions for carrying out functions related to a third-party subservice that facilitates the platform's transportation matching. These one or more computing systems may take various forms and may be arranged in various manners, such as any one of the forms and/or arrangements discussed above with reference to transportation-matching system 701.

Moreover, third-party system 705 may be configured to perform functions related to various subservices. For instance, as one possibility, third-party system 705 may be configured to monitor traffic conditions and provide traffic data to transportation-matching system 701 and/or vehicle 704, which may be used for a variety of purposes. For example, transportation-matching system 701 may use such data to facilitate fulfilling transportation requests in the first instance and/or updating the progress of initiated transportation events, and vehicle 704 may use such data to facilitate updating certain predictions regarding perceived agents and/or the vehicle's behavior plan, among other possibilities.

As another possibility, third-party system 705 may be configured to monitor weather conditions and provide weather data to transportation-matching system 701 and/or vehicle 704, which may be used for a variety of purposes. For example, transportation-matching system 701 may use such data to facilitate fulfilling transportation requests in the first instance and/or updating the progress of initiated transportation events, and vehicle 704 may use such data to facilitate updating certain predictions regarding perceived agents and/or the vehicle's behavior plan, among other possibilities.

As yet another possibility, third-party system 705 may be configured to authorize and process electronic payments for transportation requests. For example, after transportation requestor 703 submits a request for a new transportation event via client station 702, third-party system 705 may be configured to confirm that an electronic payment method for transportation requestor 703 is valid and authorized and then inform transportation-matching system 701 of this confirmation, which may cause transportation-matching system 701 to dispatch vehicle 704 to pick up transportation requestor 703. After receiving a notification that the transportation event is complete, third-party system 705 may then charge the authorized electronic payment method for transportation requestor 703 according to the fare for the transportation event. Other possibilities also exist.

Third-party system 705 may be configured to perform various other functions related to subservices that facilitate the platform's transportation matching as well. It should be understood that, although certain functions were discussed as being performed by third-party system 705, some or all of these functions may instead be performed by transportation-matching system 701.

As discussed above, transportation-matching system 701 may be communicatively coupled to client station 702, vehicle 704, and third-party system 705 via communication network 706, which may take various forms. For instance, at a high level, communication network 706 may include one or more Wide-Area Networks (WANs) (e.g., the Internet or a cellular network), Local-Area Networks (LANs), and/or Personal Area Networks (PANs), among other possibilities, where each such network may be wired and/or wireless and may carry data according to any of various different communication protocols. Further, it should be understood that the respective communication paths between the various entities of FIG. 6 may take other forms as well, including the possibility that such communication paths include communication links and/or intermediate devices that are not shown.

In the foregoing arrangement, client station 702, vehicle 704, and/or third-party system 705 may also be capable of indirectly communicating with one another via transportation-matching system 701. Additionally, although not shown, it is possible that client station 702, vehicle 704, and/or third-party system 705 may be configured to communicate directly with one another as well (e.g., via a short-range wireless communication path or the like). Further, vehicle 704 may also include a user-interface system that may facilitate direct interaction between transportation requestor 703 and vehicle 704 once transportation requestor 703 enters vehicle 704 and the transportation event begins.

It should be understood that transportation-matching platform 700 may include various other entities and take various other forms as well.

Figure 8:
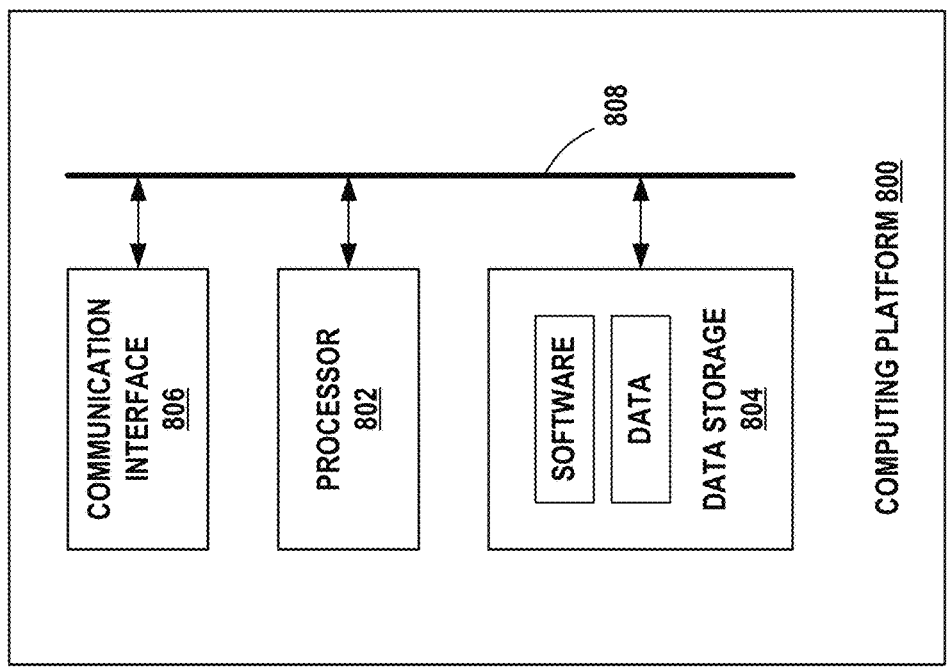
FIG. 8 is a simplified block diagram that illustrates some structural components that may be included in an example computing platform.

Turning now to FIG. 8, a simplified block diagram is provided to illustrate some structural components that may be included in an example computing platform 800, which may be configured to carry out the any of various functions disclosed herein—including but not limited to the functions included in the example pipeline described with reference to FIGS. 3A-3I and FIGS. 4-5. At a high level, computing platform 800 may generally comprise any one or more computer systems (e.g., one or more servers) that collectively include at least a processor 802, data storage 804, and a communication interface 806, all of which may be communicatively linked by a communication link 808 that may take the form of a system bus, a communication network such as a public, private, or hybrid cloud, or some other connection mechanism. Each of these components may take various forms.

For instance, processor 802 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 802 could comprise processing components that are distributed across a plurality of physical computing devices connected via a network, such as a computing cluster of a public, private, or hybrid cloud.

In turn, data storage 804 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 804 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 8, data storage 804 may be capable of storing both (i) program instructions that are executable by processor 802 such that on-board computing system 602 is configured to perform any of the various functions disclosed herein (including but not limited to any the functions described with reference to FIGS. 3A-3I and 4-5), and (ii) data that may be received, derived, or otherwise stored by computing platform 800.

Communication interface 806 may take the form of any one or more interfaces that facilitate communication between computing platform 800 and other systems or devices. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols, among other possibilities.

Although not shown, computing platform 800 may additionally include one or more input/output (I/O) interfaces that are configured to either (i) receive and/or capture information at computing platform 800 and (ii) output information from client station 800 (e.g., for presentation to a user). In this respect, the one or more I/O interfaces may include or provide connectivity to input components such as a microphone, a camera, a keyboard, a mouse, a trackpad, a touchscreen, and/or a stylus, among other possibilities, as well as output components such as a display screen and/or an audio speaker, among other possibilities.

It should be understood that computing platform 800 is one example of a computing platform that may be used with the embodiments described herein. Numerous other arrangements are possible and contemplated herein. For instance, other computing platforms may include additional components not pictured and/or more or less of the pictured components.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and spirit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

We claim:

1. A computer-implemented method comprising:
identifying, based on steering-angle information for a vehicle having an associated sensor system for capturing sensor data, at least two times within a given period of operation of the vehicle when the vehicle was driving in a lane having substantially-straight lane geometry;
for each identified time when the vehicle was driving in a lane having substantially-straight lane geometry, determining a respective measure of a lateral offset between the vehicle's associated sensor system and a lateral reference point of the vehicle based on an inference that, because the lane had substantially-straight lane geometry at the identified time, the vehicle was laterally centered within the lane at the identified time;
based on the respective measure of the lateral offset that is determined for each of the at least two identified times, determining the lateral offset between the vehicle's associated sensor system and the lateral reference point of the vehicle, wherein determining the lateral offset comprises aggregating the respective measures of the lateral offsets that are determined for the at least two identified times; and
deriving a trajectory for the vehicle based on a combination of both (i) sensor data captured by the vehicle's associated sensor system and (ii) the determined lateral offset between the vehicle's associated sensor system and the lateral reference point of the vehicle.

2. The computer-implemented method of claim 1, wherein deriving the trajectory for the vehicle based on the combination of (i) the sensor data captured by the vehicle's associated sensor system and (ii) the determined lateral offset between the vehicle's associated sensor system and the lateral reference point of the vehicle comprises:
applying processing to the sensor data captured by the vehicle's associated sensor system and thereby deriving a trajectory for the vehicle's associated sensor system; and
using the determined lateral offset between the vehicle's associated sensor system and the lateral reference point of the vehicle to translate the trajectory for the vehicle's associated sensor system into the trajectory for the vehicle.

3. The computer-implemented method of claim 1, further comprising identifying additional times within the given period of operation of the vehicle when the vehicle was driving in a lane having substantially-straight lane geometry by:
localizing the vehicle's associated sensor system within a map encoded with lane geometry information, wherein the localizing produces a set of location points for the vehicle's associated sensor system within the map that each corresponds to a respective time during the given period of operation; and
for each of at least two location points in the set of location points:
obtaining lane geometry information for a road segment surrounding the location point;
based on the obtained lane geometry information, determining that the road segment surrounding the location point has less than a threshold extent of curvature; and
in response to the determining that the road segment surrounding the location point has less than the threshold extent of curvature, identifying the respective time corresponding to the location point as one additional time when the vehicle was driving in a lane having substantially-straight lane geometry.

4. The computer-implemented method of claim 1, wherein deriving the trajectory for the vehicle based on the combination of (i) the sensor data captured by the vehicle's associated sensor system and (ii) the determined lateral offset between the vehicle's associated sensor system and the lateral reference point of the vehicle comprises:
using the determined lateral offset between the vehicle's associated sensor system and the lateral reference point of the vehicle to adjust the sensor data captured by the vehicle's associated sensor system; and applying processing to the adjusted sensor data and thereby deriving the trajectory for the vehicle.

5. The computer-implemented method of claim 1, wherein the lateral reference point of the vehicle comprises a lateral center of the vehicle.

6. The computer-implemented method of claim 5, wherein determining the respective measure of the lateral offset between the vehicle's associated sensor system and the lateral center of the vehicle for a given time within the given period of operation comprises:
  detecting at least one lane boundary of a given lane in which the vehicle was driving at the given time;
  determining a first lateral distance between the at least one detected lane boundary and the vehicle's associated sensor system;
  determining a second lateral distance between the at least one detected lane boundary and a lateral centerline of the given lane; and
  based on the first lateral distance and the second lateral distance, determining the respective measure of the lateral offset between the vehicle's associated sensor system and the lateral center of the vehicle for the given time.

7. The computer-implemented method of claim 6, wherein detecting the at least one lane boundary of the given lane in which the vehicle was driving at the given time comprises:
  based on an analysis of sensor data captured by the vehicle's associated sensor system at or near the given time, detecting at least one object that is indicative of a lane boundary.

8. The computer-implemented method of claim 1, further comprising:
  determining elevation information for a vertical reference point related to the vehicle during the given period of operation based on one or more of (i) map data, (ii) sensor data captured by the vehicle's associated sensor system during the given period of operation, or (iii) information regarding the vehicle's physical dimensions.

9. The computer-implemented method of claim 1, wherein aggregating the respective measures of the lateral offsets that are determined for the at least two identified times comprises:
  calculating an unweighted or weighted average of the respective measures of the lateral offsets.

10. The computer-implemented method of claim 1, wherein aggregating the respective measures of the lateral offsets that are determined for the at least two identified times comprises:
  identifying a given time frame within the given period of operation during which a position of the vehicle's associated sensor system did not change relative to the vehicle;
  identifying a subset of the at least two identified times that fall within the given time frame; and
  aggregating the respective measures of the lateral offsets for the identified subset of the at least two identified times.

11. The computer-implemented method of claim 1, further comprising:
  determining a longitudinal offset between the vehicle's associated sensor system and a longitudinal reference point of the vehicle based on sensor data captured by the vehicle's associated sensor system during the given period of operation and information regarding the vehicle's physical dimensions.

12. A non-transitory computer-readable medium comprising program instructions stored thereon that, when executed by at least one processor of a computing system, cause the computing system to perform functions comprising:
  identifying, based on steering-angle information for a vehicle having an associated sensor system for capturing sensor data, at least two times within a given period of operation of the vehicle when the vehicle was driving in a lane having substantially-straight lane geometry;
  for each identified time when the vehicle was driving in a lane having substantially-straight lane geometry, determining a respective measure of a lateral offset between the vehicle's associated sensor system and a lateral reference point of the vehicle based on an inference that, because the lane had substantially-straight lane geometry at the identified time, the vehicle was laterally centered within the lane at the identified time;
  based on the respective measure of the lateral offset that is determined for each of the at least two identified times, determining the lateral offset between the vehicle's associated sensor system and the lateral reference point of the vehicle, wherein determining the lateral offset comprises aggregating the respective measures of the lateral offsets that are determined for the at least two identified times; and
  deriving a trajectory for the vehicle based on a combination of both (i) sensor data captured by the vehicle's associated sensor system and (ii) the determined lateral offset between the vehicle's associated sensor system and the lateral reference point of the vehicle.

13. The non-transitory computer-readable medium of claim 12, further comprising program instructions stored thereon that, when executed by at least one processor of the computing system, cause the computing system to perform functions comprising identifying additional times within the given period of operation of the vehicle when the vehicle was driving in a lane having substantially-straight lane geometry by:
  localizing the vehicle's associated sensor system within a map encoded with lane geometry information, wherein the localizing produces a set of location points for the vehicle's associated sensor system within the map that each corresponds to a respective time during the given period of operation; and
  for each of at least two location points in the set of location points:
    obtaining lane geometry information for a road segment surrounding the location point;
    based on the obtained lane geometry information, determining that the road segment surrounding the location point has less than a threshold extent of curvature; and
    in response to the determining that the road segment surrounding the location point has less than the threshold extent of curvature, identifying the respective time corresponding to the location point as one additional time when the vehicle was driving in a lane having substantially-straight lane geometry.

14. The non-transitory computer-readable medium of claim 12, wherein the lateral reference point of the vehicle comprises a lateral center of the vehicle, and wherein determining the respective measure of the lateral offset between the vehicle's associated sensor system and the lateral center of the vehicle for a given time within the given period of operation comprises:

detecting at least one lane boundary of a given lane in which the vehicle was driving at the given time;

determining a first lateral distance between the at least one detected lane boundary and the vehicle's associated sensor system;

determining a second lateral distance between the at least one detected lane boundary and a lateral centerline of the given lane; and based on the first lateral distance and the second lateral distance, determining the respective measure of the lateral offset between the vehicle's associated sensor system and the lateral center of the vehicle for the given time.

15. The non-transitory computer-readable medium of claim 12, further comprising program instructions stored thereon that, when executed by at least one processor of the computing system, cause the computing system to perform functions comprising:

determining a longitudinal offset between the vehicle's associated sensor system and a longitudinal reference point of the vehicle based on sensor data captured by the vehicle's associated sensor system during the given period of operation and information regarding the vehicle's physical dimensions.

16. The non-transitory computer-readable medium of claim 12, further comprising program instructions stored thereon that, when executed by at least one processor of the computing system, cause the computing system to perform functions comprising:

determining elevation information for a vertical reference point related to the vehicle during the given period of operation based on one or more of (i) map data, (ii) sensor data captured by the vehicle's associated sensor system during the given period of operation, or (iii) information regarding the vehicle's physical dimensions.

17. A computing system comprising:

at least one processor;

at least one non-transitory computer-readable medium; and program instructions stored on the at least one non-transitory computer-readable medium that are executable by the at least one processor such that the computing system is configured to:

identify, based on steering-angle information for a vehicle having an associated sensor system for capturing sensor data, at least two times within a given period of operation of the vehicle when the vehicle was driving in a lane having substantially-straight lane geometry;

for each identified time when the vehicle was driving in a lane having substantially-straight lane geometry, determine a respective measure of a lateral offset between the vehicle's associated sensor system and a lateral reference point of the vehicle based on an inference that, because the lane had substantially-straight lane geometry at the identified time, the vehicle was laterally centered within the lane at the identified time;

based on the respective measure of the lateral offset that is determined for each of the at least two identified times, determine the lateral offset between the vehicle's associated sensor system and the lateral reference point of the vehicle, wherein determining the lateral offset comprises aggregating the respective measures of the lateral offsets that are determined for the at least two identified times; and derive a trajectory for the vehicle based on a combination of both (i) sensor data captured by the vehicle's associated sensor system and (ii) the determined lateral offset between the vehicle's associated sensor system and the lateral reference point of the vehicle.

18. The computing system of claim 17, wherein the lateral reference point of the vehicle comprises a lateral center of the vehicle, and wherein the program instructions that are executable by the at least one processor such that the computing system is configured to determine the respective measure of the lateral offset between the vehicle's associated sensor system and the lateral center of the vehicle for each identified time comprise program instructions that are executable by the at least one processor such that the computing system is configured to:

detect at least one lane boundary of a given lane in which the vehicle was driving at the identified time;

determine a first lateral distance between the at least one detected lane boundary and the vehicle's associated sensor system;

determine a second lateral distance between the at least one detected lane boundary and a lateral centerline of the given lane; and based on the first lateral distance and the second lateral distance, determine the respective measure of the lateral offset between the vehicle's associated sensor system and the lateral center of the vehicle for the identified time.

* * * * *